United States Patent
Yamahira

(10) Patent No.: US 7,924,086 B2
(45) Date of Patent: Apr. 12, 2011

(54) BOOSTING CIRCUIT

(75) Inventor: Seiji Yamahira, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/370,057

(22) Filed: Feb. 12, 2009

(65) Prior Publication Data

US 2009/0295452 A1    Dec. 3, 2009

(30) Foreign Application Priority Data

May 29, 2008   (JP) ................................ 2008-140915

(51) Int. Cl.
*G05F 1/10*  (2006.01)
*G05F 3/02*  (2006.01)
(52) U.S. Cl. ...................................................... 327/536
(58) Field of Classification Search .................. 327/536; 363/59–60
See application file for complete search history.

(56) References Cited

U.S. PATENT DOCUMENTS

| | | | |
|---|---|---|---|
| 6,501,325 B1 * | 12/2002 | Meng | 327/536 |
| 6,794,927 B2 * | 9/2004 | Bedarida et al. | 327/536 |
| 7,023,260 B2 * | 4/2006 | Thorp et al. | 327/536 |

* cited by examiner

*Primary Examiner* — Quan Tra
(74) *Attorney, Agent, or Firm* — McDermott Will & Emery LLP

(57) ABSTRACT

A boosting circuit configuration with high boosting efficiency is provided which is based on a boosting circuit that performs an operation in accordance with a two-phase clock and which includes a plurality ($M \geq 4$) of boosting cell sequences (units). A boosting cell in a K-th sequence ($1 \leq K \leq M$) is controlled, depending on the potential of the output terminal of a boosting cell in a KA-th sequence (KA=(K−1) when (K−1)>0, and KA=M when (K−1)=0). Thereby, before a clock input to the boosting cell in the K-th sequence goes from "L" to "H", so that boosting is performed, a charge transfer transistor can be caused to go from the conductive state to the non-conductive state, so that a backflow of charges via charge transfer transistor can be prevented.

34 Claims, 18 Drawing Sheets

"1" when CLK=H
"0" when CLK=L time T1 (=time T5) (boosting standby state)

time T2 (boosting state)

time T3 (boosting state)

time T4 (charge transfer state)

FIG.5

| operating state of boosting cell | | input clock | voltage conditions | | state of charge transfer transistor controlled under voltage conditions | |
|---|---|---|---|---|---|---|
| | | CLK | V(Sig) | V(SourceP) | exemplary gate voltage: VN1 | state |
| 1 | boosting standby state | L | ≥ V(INPUT) +Vtm2 | ≤ V(Sig) + \|Vtm3\| | = V(INPUT) | non-conductive |
| 2 | boosting state | H | ≥ V(INPUT) +Vtm2 | ≤ V(Sig)+ \|Vtm3\| | = V(INPUT) | non-conductive |
| 3 | charge transfer state | L | ≤ V(INPUT) +Vtm2 | ≥ V(Sig)+ \|Vtm3\| | = V(SourceP) | conductive |

※ forbidding voltage conditions
during operating state transition : V(INPUT) + Vtm2 ≤ V(Sig) + |Vtm3| ≤ V(SoruceP)

ex.) V(INPUT) = VV1 ≤ V(Sig) =VV2 ≤ V(SorucePe)=VV3

※ tolerance voltage conditions
during operating state transition : V(INPUT) = V(Sig) = V(SoruceP)

ex.) V(INPUT) = VV2 ≤ V(Sig) =VV2 ≤ V(SorucePe)=VV2

BOOSTING CIRCUIT

BACKGROUND OF THE INVENTION

1. Field of the Invention

The present invention relates to a boosting circuit.

2. Description of the Related Art

In recent years, flash memories, which are non-volatile storage devices, are demanded to perform a data read operation and a data rewrite operation with a single power supply voltage or a low power supply voltage, and require a boosting circuit for supplying a positive boosting voltage or a negative boosting voltage on an ON chip when each operation is performed. Also in a CMOS process, a voltage generated by a boosting circuit is used as a power supply to improve a characteristic of an analog circuit.

FIG. 17 shows a configuration of a conventional boosting circuit (see U.S. Pat. No. 7,023,260). A boosting circuit 900 performs a boosting operation using two input clock signals CLK1 and CLK2 having phases different from each other. The boosting circuit 900 comprises boosting cells 141 and 161 that perform a boosting operation, charge transfer transistors 146 and 166 that transfer charges from input terminals INPUT 2A (or 2B) to output terminals OUTPUT 2A (or 2B), diode means 147 and 167 that are provided between the input terminal INPUT 2A (or 2B) and the output terminal OUTPUT 2A (or 2B), boosting capacitances 148 and 168 that are boosted, depending on the clock signals CLK1 and CLK2, inverters 150 and 170 that control the charge transfer transistor 146 (or 166) by switching the input terminal INPUT 2A (or 2B) of one boosting cell 141 (or 161) and the output terminal OUTPUT 2B (or 2A) of the other boosting cell 161 (or 141), depending on the potential of the output terminal OUTPUT 2A (or 2B), and outputs 152 and 172 of the inverters 150 and 170.

Next, an operation of the boosting circuit of FIG. 17 will be briefly described with reference to FIG. 18.

Initially, in a state at time T1, the clock signal CLK1 goes from "L" to "H", so that the output terminal OUTPUT 2A of the boosting cell 141 is boosted. Since the output terminal OUTPUT 2A is boosted, the output 152 of the inverter 150 is switched from the voltage of the output terminal OUTPUT 2B of the boosting cell 161 to the voltage of the input terminal INPUT 2A of the boosting cell 141. Thereby, the gate voltage and the source voltage of the charge transfer transistor 146 have the same potential, so that the charge transfer transistor 146 is changed from the conductive state to the non-conductive state. Also, on the other hand, the clock signal CLK2 goes from "H" to "L", so that the potential of the output terminal OUTPUT 2B of the boosting cell 161 is decreased. The decrease of the output terminal OUTPUT 2B causes the output 172 of the inverter 170 to switch from the voltage of the input terminal INPUT 2B of the boosting cell 161 to the voltage of the output terminal OUTPUT 2A of the boosting cell 141. Thereby, the gate voltage of the charge transfer transistor 166 becomes higher than the source voltage thereof, so that the charge transfer transistor 166 is changed from the non-conductive state to the conductive state, and therefore, charges are transferred from the input terminal INPUT 2B to the output terminal OUTPUT 2B.

Next, at time T2, an operation reverse to that of the boosting cells 141 and 161 using the clock signals CLK1 and CLK2 at time T1 is performed, so that charges are transferred from the input terminal INPUT 2A to the output terminal OUTPUT 2A in the boosting cell 141, and the output terminal OUTPUT 2B is boosted in the boosting cell 161.

Thereafter, the operations described above are repeatedly performed, thereby performing a boosting operation.

SUMMARY OF THE INVENTION

In the aforementioned conventional boosting circuit, after the clock signal goes from "L" to "H" and the output terminal of the boosting cell is then boosted, the logic of the output of the inverter is reversed, thereby causing the charge transfer transistor to go from the conductive state to the non-conductive state. Therefore, immediately after the boosting, charges flow from the output terminal back to the input terminal of the boosting cell via the charge transfer transistor in the conductive state, resulting in a decrease in boosting efficiency.

An object of the present invention is to prevent the backflow of charges via a charge transfer transistor in a boosting circuit.

To achieve the object, a boosting circuit according to an aspect of the present invention has boosting cells arranged in M parallel sequences ($M \geq 4$) and L stages ($L \geq 2$), the boosting cells performing a boosting operation in synchronization with a plurality of clock signals having different phases. The boosting cell provided in a K-th sequence ($1 \leq K \leq M$) and in an I-th stage ($1 \leq I \leq L$), includes an input terminal for receiving a voltage from a stage preceding the boosting cell, an output terminal for supplying a voltage to a stage following the boosting cell, a boosting capacitance having two ends, one end being connected to the output terminal of the boosting cell, and the other end receiving a clock signal corresponding to the boosting cell, a charge transfer transistor connected between the input terminal and the output terminal of the boosting cell, and for transferring charges from the input terminal to the output terminal when the charge transfer transistor is in a conductive state, and a state control unit for controlling the charge transfer transistor, depending on an output terminal voltage of a boosting cell in a KA-th sequence ($KA=(K-A)$ when $(K-A)>0$, and $KA=(M-|K-A|)$ when $(K-A) \leq 0$) located A sequences before the K-th sequence ($1 \leq A \leq M/2-1$: A is a natural number).

According to the present invention, in the multi-phase parallel boosting circuit based on the two-phase clock boosting circuit, it is possible to set the charge transfer transistor to be in the non-conductive state during a boosting operation while maintaining the use of a simple clock signal that is an advantage of the two-phase clock boosting circuit and the avoidance of an increase in area due to a sub-capacitance. Therefore, a backflow of charges via the charge transfer transistor can be suppressed, resulting in an improvement in boosting efficiency.

Also, by increasing the number of boosting cell sequences, a charge transfer time can be increased, so that an increase in layout size of the charge transfer transistor can be suppressed.

Also, by connecting a control signal for a boosting cell (a backflow preventing cell) to the output terminal of a boosting cell (a backflow preventing cell) located A sequences before that boosting cell ($1 \leq A \leq M/2-1$), a boosting standby state time optimal to the charge transfer transistor can be set and a sufficient charge transfer time can be adjusted.

Note that if the number of boosting cell sequences is four or more, the aforementioned effect can be obtained no matter whether the number of boosting cell sequences is odd or even.

Also, according to the present invention, the arrangement of transistor units can be designed so that an increase in wiring extension between each boosting cell can be suppressed, so that a margin of timing during a boosting operation can be ensured.

These effects can be similarly obtained for a negative boosting circuit in addition to a positive boosting circuit. Also, if a P-channel (Pch) transistor is used as the charge transfer transistor, it is possible to avoid parasitic bipolar generation that is likely to occur when an N-channel (Nch) transistor is employed, so that a stable boosting operation can be performed.

BRIEF DESCRIPTION OF THE DRAWINGS

FIG. 5 is a diagram showing the operation modes of the boosting cell of the boosting circuit of FIG. 1 and voltage constraint conditions.

DETAILED DESCRIPTION OF THE PREFERRED EMBODIMENTS

Hereinafter, embodiments of the present invention will be described in detail with reference to the accompanying drawings. Note that the same or like parts are indicated with the same reference symbols and will not be repeatedly described.

First Embodiment

Configuration

Figure 1:
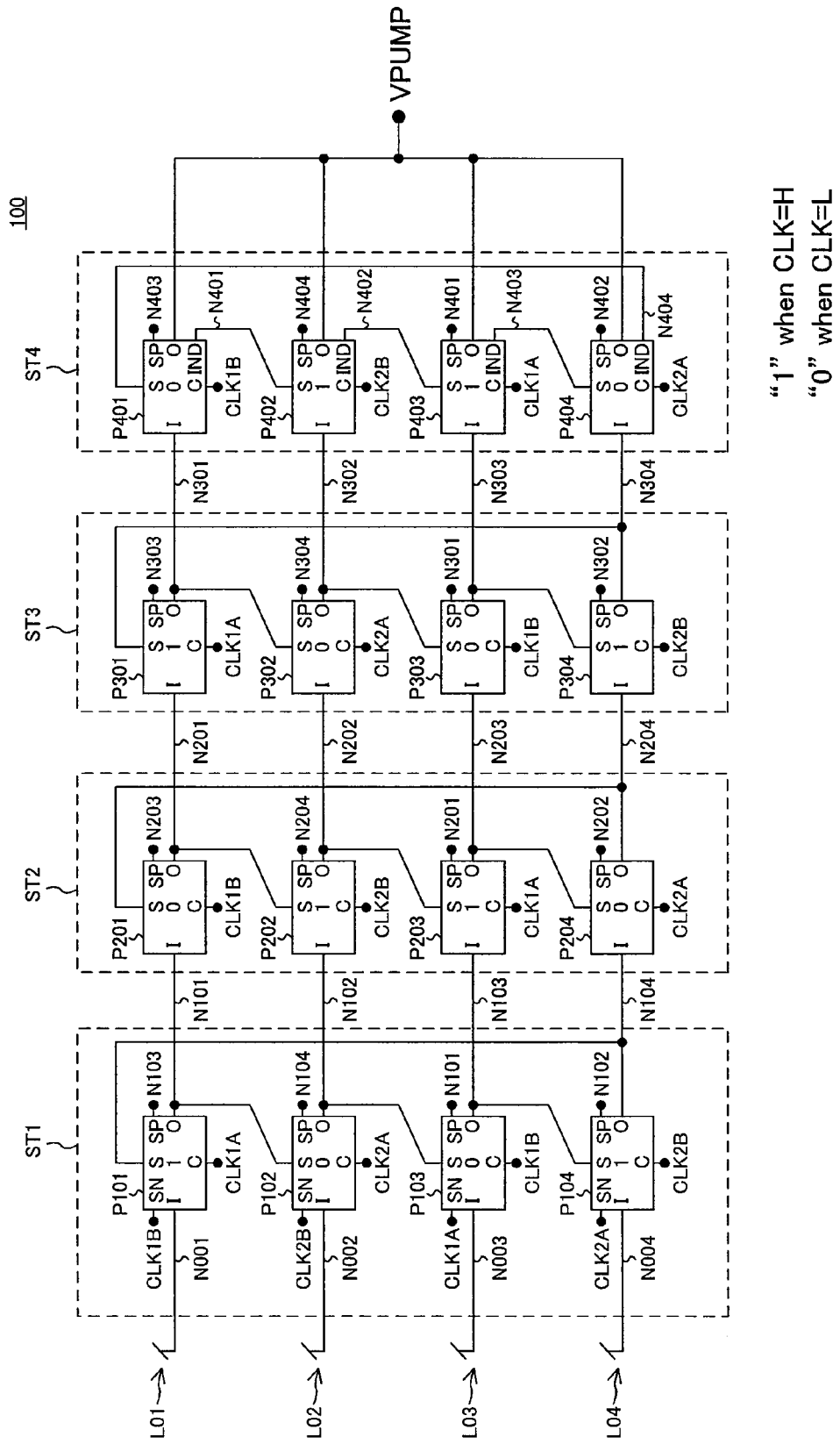
FIG. 1 is a block diagram showing a configuration of a boosting circuit according to a first embodiment of the present invention.

FIG. 1 shows a configuration of a boosting circuit 100 according to a first embodiment of the present invention. The boosting circuit 100 comprises a plurality of cells, which form boosting cell sequences L01 to L04, and boosting stages ST1 to ST3 and a backflow preventing circuit ST4. The boosting stage (first stage) ST1 includes boosting cells P101 to P104, the boosting stage (second stage) ST2 includes boosting cells P201 to P204, the boosting stage (third stage) ST3 includes boosting cells P301 to P304, and the backflow preventing circuit ST4 includes backflow preventing cells P401 to P404. These cells are each operated in synchronization with a corresponding one of clock signals CLK1A, CLK2A, CLK1B and CLK2B, thereby performing a boosting operation.

The plurality (N=4) of clock signals CLK1A, CLK2A, CLK1B and CLK2B have a phase difference of about (360 degrees/N) between each other. CLK1A firstly goes from "L" to "H", CLK2A next goes from "L" to "H", CLK1B next goes from "L" to "H", and CLK2B finally goes from "L" to "H". A pair of CLK1A and CLK1B and a pair of CLK2A and CLK2B desirably each have a phase difference of about 180 degrees. Although the clock signals CLK1A and CLK1B are input to the boosting cell sequences L01 and L03, CLK3B corresponding to CLK1B and CLK3A corresponding to CLK1A may be used with respect to the boosting cell sequence L03. Also, similarly, CLK4B corresponding to CLK2B and CLK4A corresponding to CLK2A may be used with respect to the boosting cell sequence L04. N001 to N004, N101 to N104, N201 to N204, and N301 to N304 are input/output terminals of the boosting cells P101 to P104, P201 to P204, and P301 to P304, and N401 to N404 are intermediate terminals of the backflow preventing cells P401 to P404.

The order of boosting cell sequences will be hereinafter described. As a representative example, the boosting stage ST1 is described for illustrative purposes. The same is true of the other boosting stages or the backflow preventing circuit.

Regarding the boosting cells P101 to P104 included in the boosting stage ST1, the order of the boosting cell sequences is an order in which the input clock signals go from "L" to "H". Therefore, if the boosting cell sequence L01 including the boosting cell P101 that receives the clock signal CLK1A is assumed to be the first sequence, the boosting cell sequence L02 including the boosting cell P102 that receives the clock signal CLK2A that next goes from "L" to "H" after the clock signal CLK1A goes from "L" to "H", is the second sequence, and the boosting cell sequence L03 including the boosting cell P103 that receives the clock signal CLK1B next goes from "L" to "H", is the third sequence. Similarly, the boosting cell sequence L04 including the boosting cell P104 that receives the clock signal CLK2B that next goes from "L" to "H", is the fourth sequence (final sequence). The same is true when there are more than four boosting cell sequences, i.e., the order of boosting cell sequences is an order in which clock signals input to boosting cells in any boosting stage go from "L" to "H" (the same is true when clock signals go from "H" to "L").

The boosting cells P101, P201 and P301 and the backflow preventing cell P401 in the boosting cell sequence L01 are connected in series. The boosting cells P101 and P301 in (2K+1)-th stages (K≧0) from the leading stage receive the clock signal CLK1A, and the boosting cell P201 in a (2K+2)-th stage from the leading stage receives the clock signal CLK1B. Also, the backflow preventing cell P401 receives the same clock signal CLK1B that is input to the boosting cell P201 located one stage before the boosting cell P301 in the final stage.

The boosting cells P102, P202 and P302 and the backflow preventing cell P402 in the boosting cell sequence L02 are connected in series. The boosting cells P102 and P302 in (2K+1)-th (K≧0) stages from the leading stage receive the clock signal CLK2A, and the boosting cell P202 in a (2K+2)-th stage from the leading stage receives the clock signal CLK2B. Also, the backflow preventing cell P402 receives the same clock signal CLK2B that is input to the boosting cell P202 located one stage before the boosting cell P302 in the final stage.

The boosting cells P103, P203 and P303 and the backflow preventing cell P403 in the boosting cell sequence L03 are connected in series. The boosting cells P103 and P303 in (2K+1)-th (K≧0) stages from the leading stage receive the clock signal CLK1B, and the boosting cell P203 in a (2K+2)-th stage from the leading stage receives the clock signal CLK1A. Also, the backflow preventing cell P403 receives the same clock signal CLK1A that is input to the boosting cell P203 located one stage before the boosting cell P303 in the final stage.

The boosting cell P104, P204 and P304 and the backflow preventing cell P404 in the boosting cell sequence L04 are connected in series. The boosting cells P104 and P304 in (2K+1)-th (K≧0) stages from the leading stage receive the clock signal CLK2B, and the boosting cell P204 in a (2K+2)-th stage from the leading stage receives the clock signal CLK2A. Also, the backflow preventing cell P404 receives the same clock signal CLK2A that is input to the boosting cell P204 located one stage before the boosting cell P304 in the final stage.

Thus, for the boosting cells P101 to P104, P201 to P204, and P301 to P304, and the backflow preventing cells P401 to P404, the state of a boosting clock at a time is represented by "0" or "1" as described in FIG. 1.

Next, the boosting cells P101 to P104, P201 to P204, and P301 to P304, and the backflow preventing cells P401 to P404 included in the boosting stages ST1 to ST4 will be described.

Regarding the boosting cells P101 to P104 included in the first boosting stage ST1, the boosting cell P101 in the boosting cell sequence L01 is connected to the input/output terminal N104 of the boosting cell P104 in the boosting cell sequence L04, and performs a boosting operation by switching the potential of the clock signal CLK1B or the potential of the input/output terminal N103 of the boosting cell P103 in the boosting cell sequence L03, depending on the potential of the input/output terminal N104.

Similarly, the boosting cell P102 in the boosting cell sequence L02 is connected to the input/output terminal N101 of the boosting cell P101 in the boosting cell sequence L01, and performs a boosting operation by switching the potential of the clock signal CLK2B or the potential of the input/output terminal N104 of the boosting cell P104 in the boosting cell sequence L04, depending on the potential of the input/output terminal N101.

Also, the boosting cell P103 in the boosting cell sequence L03 is connected to the input/output terminal N102 of the boosting cell P102 in the boosting cell sequence L02, and performs a boosting operation by switching the potential of the clock signal CLK1A or the potential of the input/output terminal N101 of the boosting cell P101 in the boosting cell sequence L01, depending on the potential of the input/output terminal N102.

Also, the boosting cell P104 in the boosting cell sequence L04 is connected to the input/output terminal N103 of the boosting cell P103 in the boosting cell sequence L03, and performs a boosting operation by switching the potential of the clock signal CLK2A or the potential of the input/output terminal N102 of the boosting cell P102 in the boosting cell sequence L02, depending on the potential of the input/output terminal N103.

In other words, in the first boosting stage ST1 and in the boosting cell sequences L01 to L04 (M boosting cell sequences arranged in parallel (M=4)), a boosting cell in a K-th sequence is connected to the output terminal of a boosting cell in a (K−1)-th sequence (1≦K≦M, and (K−1)=M when K=1), and depending on the potential of the output terminal of the boosting cell in the (K−1)-th sequence, switches the voltage of a clock signal having a phase reverse to a clock signal input to the boosting cell, and the voltage of the output terminal of a boosting cell in a KB-th sequence operating at a phase different by about 180 degrees from that of the boosting cell in the K-th sequence (KB=(M/2+K) when K≦(M/2), and KB=(K−M/2) when K>(M/2)).

Also, in the second boosting stage ST2, a boosting cell in a K-th sequence is connected to the output terminal of a boosting cell in a (K−1)-th sequence (1≦K≦M, and (K−1)=M when K=1), and, depending on the potential of the output terminal of the boosting cell in the (K−1)-th sequence, performs a boosting operation by switching the voltage of an input/output terminal (any of N201 to N204) connected to the boosting cell in the K-th sequence, and the voltage of the output terminal of a boosting cell in a KB-th sequence operating at a phase different by about 180 degrees from that of the boosting cell in the K-th sequence (KB=(M/2+K) when K≦(M/2), and KB=(K−M/2) when K>(M/2)). The third boosting stage ST3 is similar to the second boosting stage ST2.

In the backflow preventing circuit ST4, a backflow preventing cell in a K-th sequence is connected to the intermediate terminal (any of N401 to N404) of a backflow preventing cell in a (K−1)-th sequence (1≦K≦M, and (K−1)=M when K=1), and, depending on the potential of the intermediate terminal of the backflow preventing cell in the (K−1)-th sequence, performs a boosting operation by switching the voltage of the intermediate terminal (any of N401 to N404) of the backflow preventing cell in the K-th sequence, and the voltage of the output terminal of a backflow preventing cell in a KB-th sequence operating at a phase different by about 180 degrees from that of the backflow preventing cell in the K-th sequence (KB=(M/2+K) when K≦(M/2), and KB=(K-M/2) when K>(M/2)).

Note that the number of boosting stages may not be limited to three.

<Configuration of Boosting Cell>

Figure 2A:
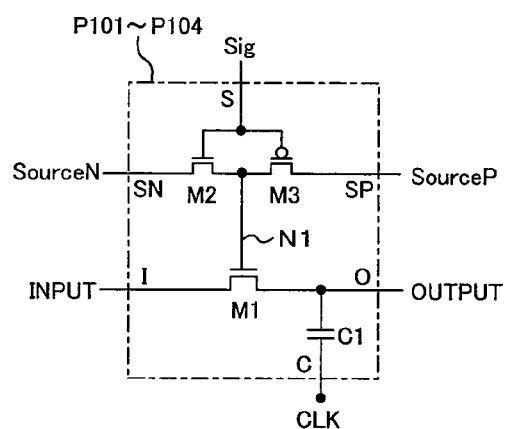
FIGS. 2A, 2B, 2C and 2D are circuit diagrams showing configurations of a boosting cell and a backflow preventing cell of FIG. 1.
Figure 2B:
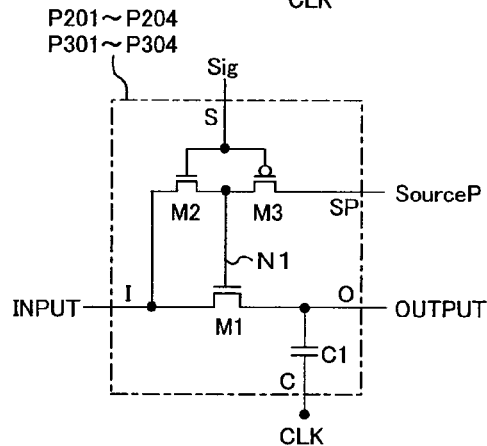

FIG. 2B shows a configuration of the boosting cells P201 to P204 in the boosting stage ST2 and the boosting cells P301 to P304 in the boosting stage ST3 of FIG. 1. The boosting cells P201 to P204 and P301 to P304 each include a charge transfer transistor M1, an OFF-switch transistor M2, an ON-switch transistor M3, and a boosting capacitance C1.

The charge transfer transistor M1 transfers charges from an input terminal INPUT to an output terminal OUTPUT. The OFF-switch transistor M2 equalizes the voltage of the gate N1 of the charge transfer transistor M1 and the voltage of the input terminal INPUT to turn OFF the charge transfer transistor M1, depending on the potential of a control signal Sig. The ON-switch transistor M3 supplies the potential of a source signal SourceP to the gate N1 of the charge transfer transistor M1 to turn ON the charge transfer transistor M1, depending on the potential of the control signal Sig. The boosting capacitance C1 is pumped in synchronization with any of the clock signals CLK1A, CLK2A, CLK1B and CLK2B input to the boosting cells P201 to P204 and P301 to P304.

FIG. 2A shows a configuration of the boosting cells P101 to P104 included in the first boosting stage ST1 of FIG. 1. The configuration of the boosting cells P101 to P104 is different from the configuration of the boosting cells P201 to P204 and P301 to P304 of FIG. 2B, in that a signal SourceN input to the source of the OFF-switch transistor M2 is controlled using a clock signal having a phase reverse to a clock signal input to the boosting cells P101 to P104. Note that the boosting cells P201 to P204 and P301 to P304 used in the second and third stages can be used in the first boosting stage ST1.

<Backflow Preventing Cell>

Figure 2C:
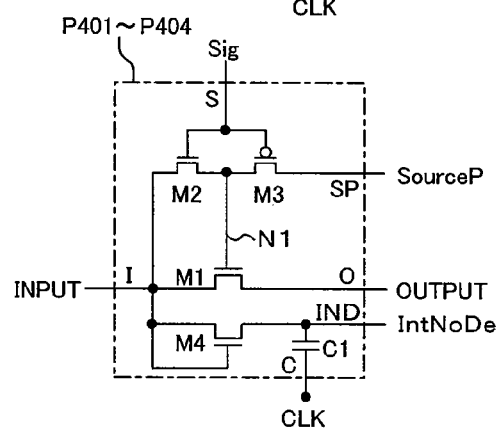

FIG. 2C shows a configuration of the backflow preventing cells P401 to P404 included in the backflow preventing circuit ST4 of FIG. 1. The configuration of the backflow preventing cells P401 to P404 is different from the configuration of the boosting cells P201 to P204 and P301 to P304 of FIG. 2B, in that an intermediate terminal IntNoDe is provided in addition to the output terminal OUTPUT, a diode-connection transistor M4 is connected between the input terminal INPUT and the intermediate terminal IntNoDe, and moreover, a boosting capacitance C1 is provided between the intermediate terminal IntNoDe and the clock signals CLK1A, CLK2A, CLK1B and CLK2B, and a boosting operation is performed in synchronization with any of the clock signals CLK1A, CLK2A, CLK1B and CLK2B.

Figure 2D:
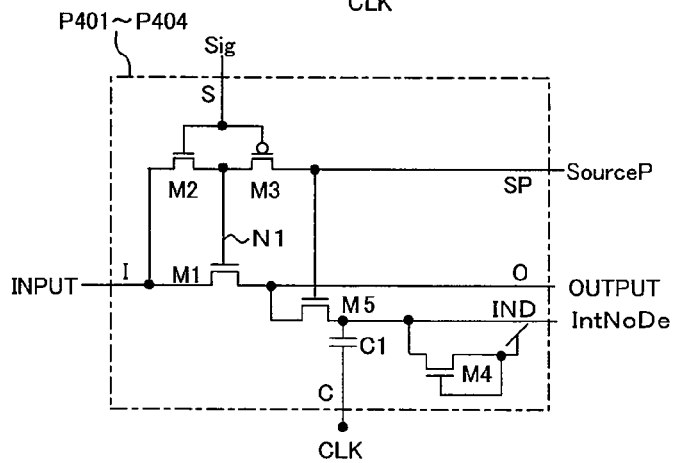

Note that the configuration of the backflow preventing cell of FIG. 2C is only for illustrative purposes, and any other configurations that satisfy a similar function may be employed. For example, as shown in FIG. 2D, a transistor M5 is provided between the output terminal OUTPUT and the intermediate terminal IntNoDe, and a gate of the transistor M5 is connected to the source signal SourceP. A boosting capacitance C1 is provided between the intermediate terminal IntNoDe and the clock signals CLK1A, CLK2A, CLK1B and CLK2B. A diode-connection transistor M4 may be connected between the power supply voltage and the intermediate terminal IntNoDe as shown in FIG. 2D, or between the input terminal INPUT and the intermediate terminal IntNoDe. Thereby, a function similar to that of FIG. 2C can be obtained. Therefore, any configurations that provide a function similar to that of FIG. 2C may be employed in addition to that of FIG. 2C.

<Operation>

Figure 3:
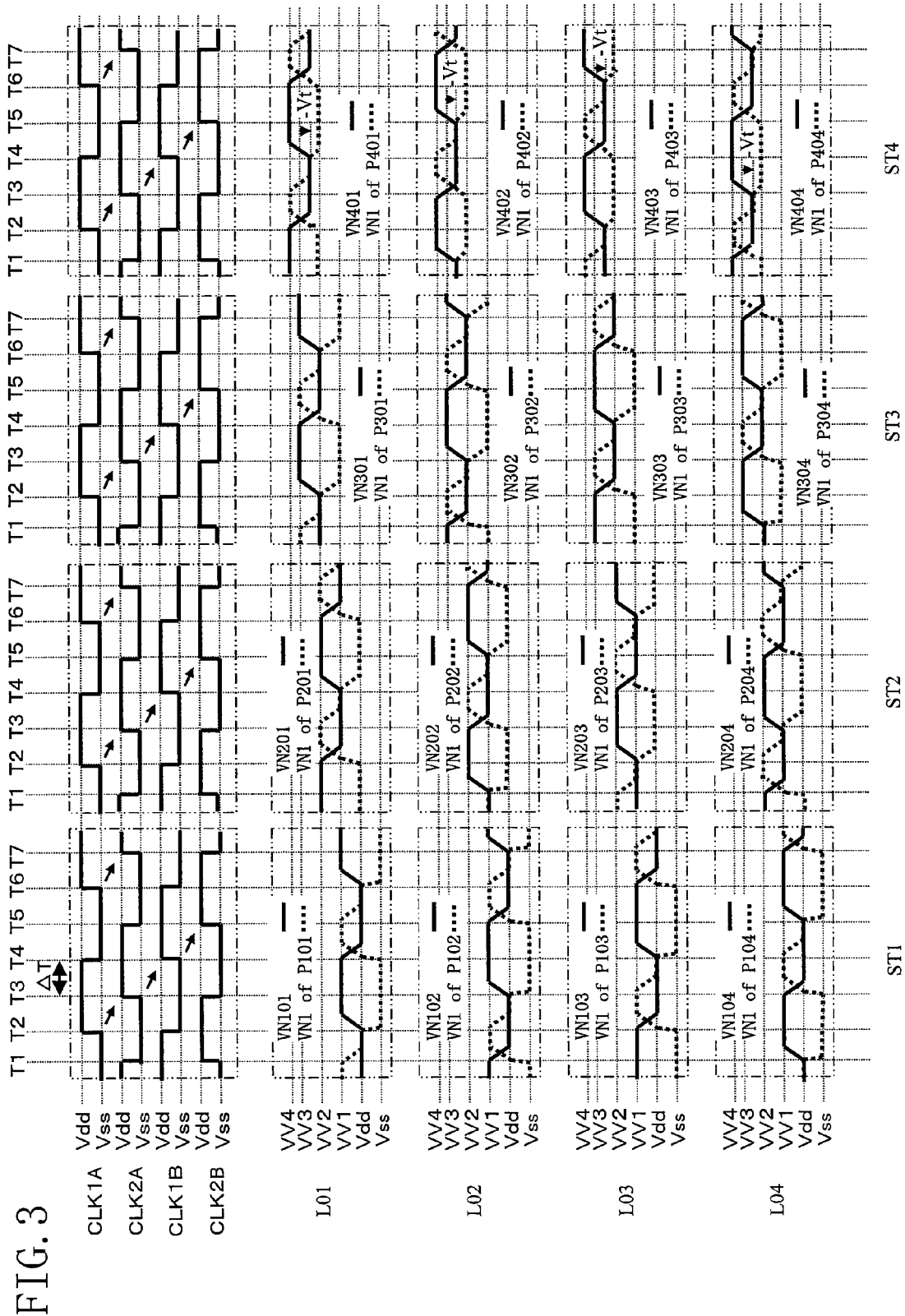
FIG. 3 is a waveform diagram for describing an operation of the boosting circuit of FIG. 1.
Figure 4A:
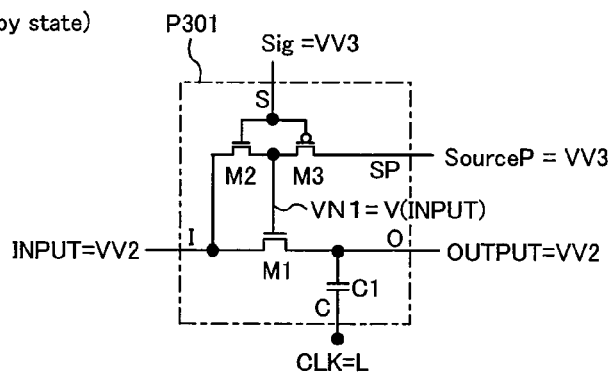
FIGS. 4A, 4B, 4C and 4D are diagrams showing operation modes of a boosting cell, for describing an operation of the boosting circuit of FIG. 1.
Figure 4B:
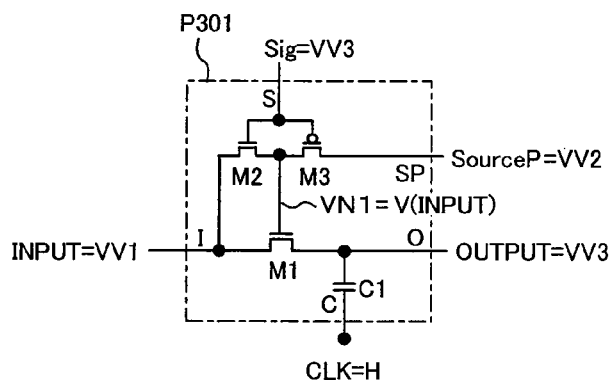
Figure 4C:
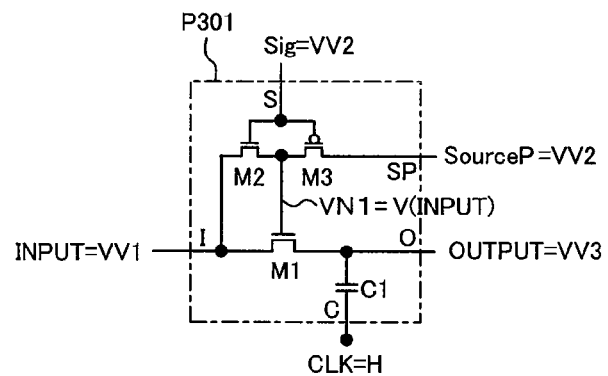
Figure 4D:
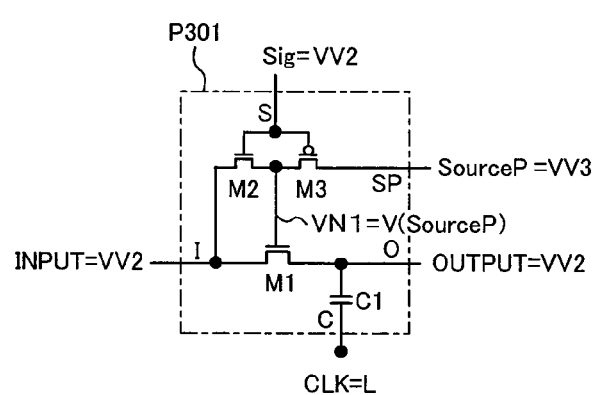

Next, an operation of the boosting circuit 100 of FIG. 1 will be described with reference to FIG. 3. Note that, assuming that the clock signals CLK1A, CLK2A, CLK1B and CLK2B each have amplitudes ranging between a power supply potential Vdd and a ground potential Vss, a case where the output terminal of the boosting circuit 100 has neither a current load nor a voltage limit will be described. Also, VV1, VV2, VV3 and VV4 in FIG. 3 are the following.

$(VV1) = Vdd + \alpha \cdot Vdd$ $(VV2) = Vdd + 2\alpha \cdot Vdd$ $(VV3) = Vdd + 3\alpha \cdot Vdd$ $(VV4) = Vdd + 4\alpha \cdot Vdd - Vt$ Also, referring to FIGS. 4A to 4D, operation modes of the boosting cells and the backflow preventing cells are classified, and a relationship and a constraint between the clock signals CLK, the voltages of the input terminals (INPUT) of the boosting cells, and the potentials of the control signal Sig and the source signal SourceP in each operation mode are clarified, using the boosting cell P301 as a representative of the boosting cells P101 to P104, P201 to P204, and P301 to P304, and the backflow preventing cells P401 to P404.

[Time T1]

Initially, at time T1, the voltage of the source signal SourceN of the OFF-switch transistor M2 in each of the boosting cell P101 in the boosting cell sequence L01 and in the boosting stage ST1 that performs a boosting operation in synchronization with the clock signal CLK1A, and the boosting cell P301 in the boosting stage ST3, is the following.

$(CLK1B) = H = Vdd$ $(VN201) = VV2$

Also, the clock signal CLK1B input to the boosting cells P103 and P303 in the boosting cell sequence L03 is at "H", so that the voltages VN103 and VN303 of the input/output terminals N103 and N303 are the following.

$(VN103) = VV1$ $(VN303) = VV3$

Also, the clock signal CLK2B input to the boosting cells P104 and P304 in the boosting cell sequence L04 is at "H", so the voltages VN104 and VN304 of the input/output terminals N104 and N304 are the following.

$(VN104) = VV1$ $(VN304) = VV3$

Thus, in each of the boosting cells P101 and P301 in the boosting cell sequence L01, the potential difference between the gate and the source of the ON-switch transistor M3 is the following.

$(VN104) - (VN103) = VV1 - VV1 = 0$ $(VN304) - (VN303) = VV3 - VV3 = 0$

On the other hand, the potential difference between the gate and the source of the OFF-switch transistor M2 is the following.

$(VN104) - (CLK1B) = VV1 - Vdd = \alpha \cdot Vdd$ $(VN304) - (VN201) = VV3 - VV2 = \alpha \cdot Vdd$ Therefore, the OFF-switch transistor M2 is in the conductive state. Therefore, the voltages VN1 of the gates N1 of the charge transfer transistors M1 of the boosting cells P101 and P301 in the boosting cell sequence L01 are Vdd and VV2, respectively, and the potential differences between the gates and the sources of the charge transfer transistors M1 of the boosting cells P101 and P301 are the following.

$(VN1\ of\ P101) - (VN001) = Vdd - Vdd = 0$ $(VN1\ of\ P301) - (VN201) = VV2 - VV2 = 0$

Thus, the gate and source are set to have the same potential, so that the charge transfer transistors M1 are in the non-conductive state.

Also, similarly, in the boosting cell P203 in the boosting cell sequence L03 and in the boosting stage ST2 that operate a boosting operation in synchronization with the clock signal CLK1A, and the backflow preventing cell P403 in the backflow preventing circuit ST4, the OFF-switch transistors M2 of the cells are in the conductive state, and the gates and the sources of the charge transfer transistors M1 have the same potential, so that the charge transfer transistors M1 are in the non-conductive state.

[Time T2]

Next, at time T2, the clock signal CLK1A goes from "L" to "H". Thereby, the voltages VN101 and VN301 of the input/output terminals N101 and N301 of the boosting cell P101 in the boosting stage ST1 and the boosting cell P301 in the boosting stage ST3, in the boosting cell sequence L01, are boosted to the following.

$$(VN101)=VV1$$

$$(VN301)=VV3$$

In this case, the charge transfer transistors M1 of the boosting cells P101 and P301 have been set to be in the non-conductive state since time T1. Therefore, it is clear that a backflow of charges does not occur via these charge transfer transistors M1.

Also, at the same time when the boosting operations of the boosting cells P101 and P301 are performed in synchronization with the clock signal CLK1A, the clock signal CLK1B goes from "H" to "L", so that the boosting cell P201 in the boosting stage ST2 and the backflow preventing cell P401 of the backflow preventing circuit ST4, in the boosting cell sequence L01, go to the charge transfer state. The terminal voltages of the boosting cell P201 and the backflow preventing cell P401 are the following.

The clock signal CLK2A input to the boosting cell P204 in the boosting stage ST2 and the backflow preventing cell P404 of the backflow preventing circuit ST4, in the boosting cell sequence L04, is held at "L", and the voltages VN204 and VN404 of the input/output terminal N204 and the intermediate terminal N404 are the following.

$$(VN204)=VV1$$

$$(VN404)=VV3-Vt$$

Also, the boosting cell P203 in the boosting stage ST2 and the backflow preventing cell P403 of the backflow preventing circuit ST4, in the boosting cell sequence L03, are boosted in synchronization with the clock signal CLK1A, so that the voltages VN203 and VN403 of an input/output terminal N203 and an intermediate terminal N403 are the following.

$$(VN203)=VV2$$

$$(VN403)=VV4$$

From these equations, the potential differences between the gates and the sources of the ON-switch transistors M3 of the boosting cell P201 in the boosting stage ST2 and the backflow preventing cell P401 of the backflow preventing circuit ST4, in the boosting cell sequence L01, are the following.

$$(VN204)-(VN203)=VV1-VV2=-\alpha \cdot Vdd$$

$$(VN404)-(VN403)=VV3-Vt-VV4=-\alpha \cdot Vdd$$

On the other hand, the potential differences between the gates and the sources of the OFF-switch transistors M2 are the following.

$$(VN204)-(VN101)=VV1-VV1=0$$

$$(VN404)-(VN301)=VV3-Vt-VV3=-Vt$$

Therefore, the ON-switch transistor M3 goes to the conductive state. Thereby, the voltages VN1 of the gates N1 of the charge transfer transistors M1 of the boosting cell P201 and the backflow preventing cell P401 become VV2 and VV4, respectively, so that the potential differences between the gates and the sources of the charge transfer transistors M1 of the boosting cell P201 and the backflow preventing cell P401 are the following.

$$(VN1 \text{ of } P201)-(VN101)=VV2-VV1=\alpha \cdot Vdd$$

$$(VN1 \text{ of } P401)-(VN301)=VV4-VV3=\alpha \cdot Vdd-Vt$$

Therefore, the charge transfer transistors M1 of the boosting cell P201 and the backflow preventing cell P401 go to the conductive state, i.e., the charge transfer state. Thereby, charges of the input/output terminal N101 boosted by the boosting cell P101 in the boosting stage ST1, are transferred via the boosting cell P201 in the boosting stage ST2 to the input/output terminal N201. Also, charges of the input/output terminal N301 boosted by the boosting cell P301 in the boosting stage ST3 are transferred via the backflow preventing cell P401 of the backflow preventing circuit ST4 to the output terminal of the boosting circuit 100, so that the output voltage VPUMP of the boosting circuit is increased.

Moreover, charges of the input/output terminal N101 boosted by the boosting cell P101 in the boosting cell sequence L01 and in the boosting stage ST1 are also supplied to the boosting cell P102 in the next boosting cell sequence L02 and in the same boosting stage ST1. Similarly, charges of the input/output terminal N301 boosted by the boosting cell P301 in the boosting cell sequence L01 and in the boosting stage ST3 are also supplied to the boosting cell P302 in the next boosting cell sequence L02 and in the same boosting stage ST3. Thereby, the gate voltages of the ON-switch transistor M3 and the OFF-switch transistor M2 of the boosting cells P102 and P302 in the next sequence increase, so that the potential differences between the gates and the sources of the ON-switch transistors M3 of the boosting cells P102 and P302 are the following.

$$(VN101)-(VN104)=(VV1)-(VV1)=0$$

$$(VN301)-(VN304)=(VV3)-(VV3)=0$$

On the other hand, the potential differences between the gates and the sources of the OFF-switch transistors M2 are the following.

$$(VN101)-(CLK2B)=(VV1)-(Vdd)=\alpha \cdot Vdd$$

$$(VN301)-(VN202)=(VV3)-(VV2)=\alpha \cdot Vdd$$

Therefore, the OFF-switch transistors M2 go to the conductive state. Thereby, as are similar to the boosting cells P101 and P301 at time T1, the voltages VN1 of the gates N1 of the charge transfer transistors M1 of the boosting cell P102 in the boosting stage ST1 and the boosting cell P302 in the boosting stage ST3, in the boosting cell sequence L02, become Vdd and VV2, respectively, so that the gates and the sources are set to have the same potential, and therefore, these charge transfer transistors M1 go to the non-conductive state.

As described above, an operation similar to that of the boosting cells P101 and P301 in the boosting cell sequence L01 at time T2 is performed in the boosting cell P203 and the backflow preventing cell P403 in the boosting cell sequence L03. Briefly, after the charge transfer transistors M1 of the boosting cell P203 and the backflow preventing cell P403 in the boosting cell sequence L03 are set to be in the non-conductive state at time T1, the input/output terminal N203 of the boosting cell P203 and the intermediate terminal N403 of the backflow preventing cell P403 are boosted at time T2. Charges of the input/output terminal N203 whose potential have been increased are transferred via the boosting cell P303 of the next boosting stage ST3 to the input/output terminal N303. Moreover, charges of the input/output terminal N203 of the boosting cell P203 are input to the boosting cell P204 in the next boosting cell sequence L04, and also, charges of intermediate terminal N403 of the next backflow preventing cell P403 are similarly input to the backflow preventing cell P404 in the boosting cell sequence L04. Thereby, the OFF-switch transistors M2 of the boosting cell P204 and the backflow preventing cell P404 in the boosting cell sequence L04 are set to be in the conductive state, and the charge transfer transistors M1 are set to be in the non-conductive state.

[Time T3]

Next, at time T3, the clock signal CLK2A goes from "L" to "H". Thereby, the voltages VN102 and VN302 of the input/output terminals N102 and N302 of the boosting cell P102 in the boosting stage ST1 and the boosting cell P302 in the boosting stage ST3, in the boosting cell sequence L02, are boosted to the following.

$$(VN102)=VV1$$

$$(VN302)=VV3$$

In this case, the charge transfer transistors M1 of the boosting cells P102 and P302 have been set to be in the non-conductive state since time T2. Therefore, it is clear that a backflow of charges does not occur via these charge transfer transistors M1.

Also, at the same time when the boosting operations of the boosting cells P102 and P302 are performed in synchronization with the clock signal CLK2A, the clock signal CLK2B goes from "H" to "L", so that the boosting cell P202 in the boosting stage ST2 and the backflow preventing cell P402 of the backflow preventing circuit ST4, in the boosting cell sequence L02, go to the charge transfer state. The terminal voltages of the boosting cell P202 and the backflow preventing cell P402 are the following.

The clock signal CLK1B input to the boosting cell P201 in the boosting stage ST2 and the backflow preventing cell P401 of the backflow preventing circuit ST4, in the boosting cell sequence L01, is held at "L", and the voltages VN201 and VN401 of the input/output terminal N201 and the intermediate terminal N401 are the following.

$$(VN201)=VV1$$

$$(VN401)=VV3-Vt$$

Also, the boosting cell P204 in the boosting stage ST2 and the backflow preventing cell P404 of the backflow preventing circuit ST4, in the boosting cell sequence L04, are boosted in synchronization with the clock signal CLK2A, so that the voltages VN204 and VN404 of the input/output terminal N204 and the intermediate terminal N404 are the following.

$$(VN204)=VV2$$

$$(VN404)=VV4$$

Thereby, the potential differences between the gates and the sources of the ON-switch transistors M3 of the boosting cell P202 in the boosting stage ST2 and the backflow preventing cell P402 of the backflow preventing circuit ST4, in the boosting cell sequence L02, are the following.

$$(VN201)-(VN204)=VV1-VV2=-\alpha \cdot Vdd$$

$$(VN401)-(VN404)=VV3-Vt-VV4=-\alpha \cdot Vdd$$

On the other hand, the potential differences between the gates and the sources of the OFF-switch transistors M2 are the following.

$$(VN201)-(VN102)=VV1-VV1=0$$

$$(VN401)-(VN302)=VV3-Vt-VV3=-Vt$$

Therefore, the ON-switch transistors M3 go to the conductive state. Thereby, the voltages VN1 of the gates N1 of the charge transfer transistors M1 of the boosting cell P202 and the backflow preventing cell P402 become VV2 and VV4, respectively, so that the potential differences between the gates and the sources of the charge transfer transistors M1 of the boosting cell P202 and the backflow preventing cell P402 are the following.

$$(VN1\ of\ P202)-(VN102)=VV2-VV1=\alpha \cdot Vdd$$

$$(VN1\ of\ P402)-(VN302)=VV4-VV3=\alpha \cdot Vdd-Vt$$

Therefore, the charge transfer transistors M1 of the boosting cell P202 and the backflow preventing cell P402 go to the conductive state, i.e., the charge transfer state. Thereby, charges of the input/output terminal N102 boosted by the boosting cell P102 in the boosting stage ST1 are transferred via the boosting cell P202 in the boosting stage ST2 to the input/output terminal N202. Also, charges of the input/output terminal N302 boosted by the boosting cell P302 in the boosting stage ST3 are transferred via the backflow preventing cell P402 of the backflow preventing circuit ST4 to the output terminal of the boosting circuit 100, so that the output voltage VPUMP of the boosting circuit is increased.

Moreover, charges of the input/output terminal N102 boosted by the boosting cell P102 in the boosting cell sequence L02 and in the boosting stage ST1 are also supplied to the boosting cell P103 in the next boosting cell sequence L03 and in the same boosting stage ST1. Similarly, charges of the input/output terminal N302 boosted by the boosting cell P302 in the boosting cell sequence L02 and in the boosting stage ST3 are also supplied to the boosting cell P303 in the next boosting cell sequence L03 and in the same boosting stage ST3. Thereby, the gate voltages of the ON-switch transistors M3 and the OFF-switch transistors M2 of the next boosting cells P103 and P303 increase, so that the potential differences between the gates and the sources of the ON-switch transistors M3 of the boosting cells P103 and P303 are the following.

$$(VN102)-(VN101)=(VV1)-(VV1)=0$$

$$(VN302)-(VN301)=(VV3)-(VV3)=0$$

On the other hand, the potential differences between the gates and the sources of the OFF-switch transistors M2 are the following.

$$(VN102)-(CLK1A)=(VV1)-(Vdd)=\alpha \cdot Vdd$$

$$(VN302)-(VN203)=(VV3)-(VV2)=\alpha \cdot Vdd$$

Therefore, the OFF-switch transistors M2 go to the conductive state. Thereby, as are similar to the boosting cells P102 and P302 at time T2, the voltages VN1 of the gates N1 of the charge transfer transistors M1 of the boosting cell P103 in the boosting stage ST1 and the boosting cell P303 of the boosting stage ST3, in the boosting cell sequence L03, become Vdd and VV2, respectively, so that the gates and the sources are set to be the same potential, and therefore, these charge transfer transistors M1 go to the non-conductive state.

As described above, operations similar to those of the boosting cells P102 and P302 in the boosting cell sequence L02 at time T3, are also performed by the boosting cell P204 and the backflow preventing cell P404 in the boosting cell sequence L04. Briefly, after the charge transfer transistors M1 of the boosting cell P204 and the backflow preventing cell P404 in the boosting cell sequence L04 are set to be in the non-conductive state at time T2, the input/output terminal N204 of the boosting cell P204 and the intermediate terminal N404 of the backflow preventing cell P404 are boosted at time T3. Charges of the input/output terminal N204 whose potential has been increased are transferred via the boosting cell P304 of the next boosting stage ST3 to the input/output terminal N304. Moreover, charges of the input/output terminal N204 of the boosting cell P204 in the final sequence are input to the boosting cell P201 in the first boosting cell sequence L01. Also, similarly, charges of the intermediate terminal N404 of the backflow preventing cell P404 in the final sequence are input to the backflow preventing cell P401 in the first boosting cell sequence L01. Thereby, the OFF-switch transistors M2 of the boosting cell P201 and the backflow preventing cell P401 in the boosting cell sequence L01 are set to be in the conductive state, and the charge transfer transistors M1 are set to be in the non-conductive state.

[Time T4]

Next, at time T4, the clock signal CLK1B goes from "L" to "H". Thereby, the voltages VN103 and VN303 of the input/output terminals N103 and N303 in the boosting cell P103 in the boosting stage ST1 and the boosting cell P303 in the boosting stage ST3, in the boosting cell sequence L03, are boosted. In this case, since the charge transfer transistors M1 of the boosting cells P103 and P303 have been set to be in the non-conductive state since time T3, it is clear that a backflow of charges via the charge transfer transistor M1 does not occur, as is similar to that which has been described above.

Charges of the input/output terminal N103 of the boosting cell P103 whose potential has been increased are transferred via the next boosting cell P203 in the boosting stage ST2 to the input/output terminal N203. Charges of the input/output terminal N303 of the boosting cell P303 are transferred via the next backflow preventing cell P403 of the next backflow preventing circuit ST4 to the output terminal of the boosting circuit 100, thereby increasing the boosting voltage VPUMP. Moreover, charges of the input/output terminal N103 of the boosting cell P103 are input to the boosting cell P104 in the next boosting cell sequence L04, and similarly, charges of the input/output terminal N303 of the boosting cell P303 are input to the boosting cell P304 in the next boosting cell sequence L04. Thereby, the OFF-switch transistors M2 of the boosting cells P104 and P304 in the boosting cell sequence L04 are set to be in the conductive state, and the charge transfer transistors M1 are set to be in the non-conductive state.

As described above, operations similar to those of the boosting cells P103 and P303 in the boosting cell sequence L03 at time T4 are also performed by the boosting cell P201 and the backflow preventing cell P401 in the boosting cell sequence L01. Briefly, after the charge transfer transistors M1 of the boosting cell P201 and the backflow preventing cell P401 in the boosting cell sequence L01 are set to be in the non-conductive state at time T3, the input/output terminal N201 of the boosting cell P201 and the intermediate terminal N401 of the backflow preventing cell P401 are boosted at time T4. Charges of the input/output terminal N201 whose potential has been increased are transferred via the next boosting cell P301 in the boosting stage ST3 to the input/output terminal N301. Moreover, charges of the input/output terminal N201 of the boosting cell P201 are input to the boosting cell P202 in the next boosting cell sequence L02. Also, similarly, charges of the intermediate terminal N401 of the backflow preventing cell P401 are input to the backflow preventing cell P402 in the next boosting cell sequence L02. Thereby, the OFF-switch transistors M2 of the boosting cell P202 and the backflow preventing cell P402 in the boosting cell sequence L02 are set to be in the conductive state, and the charge transfer transistors M1 are set to be in the non-conductive state.

[Time T5]

Next, at time T5, the clock signal CLK2B goes from "L" to "H". Thereby, the voltages VN104 and VN304 of the input/output terminals N104 and N304 of the boosting cell P104 in the boosting stage ST1 and the boosting cell P304 in the boosting stage ST3, in the boosting cell sequence L04, are boosted. In this case, since the charge transfer transistors M1 of the boosting cells P104 and P304 have been set to be in the non-conductive state since time T4, it is clear that a backflow of charges via these charge transfer transistors M1 does not occur, as is similar to that which has been described above.

Charges of the input/output terminal N104 of the boosting cell P104 whose potential has been increased are transferred via the next boosting cell P204 in the boosting stage ST2 to the input/output terminal N204, and charges of the input/output terminal N304 of the boosting cell P304 are transferred via the backflow preventing cell P404 of the next backflow preventing circuit ST4 to the output terminal of the boosting circuit 100, thereby increasing the boosting voltage VPUMP. Moreover, charges of the input/output terminal N104 of the boosting cell P104 in the final sequence are input to the boosting cell P101 in the first boosting cell sequence L01. Also, similarly, charges of the input/output terminal N304 of the boosting cell P304 in the final sequence are input to the boosting cell P301 in the first boosting cell sequence L01. Thereby, the OFF-switch transistors M2 of the boosting cells P101 and P301 in the boosting cell sequence L01 are set to be in the conductive state, and the charge transfer transistors M1 are set to be in the non-conductive state.

As described above, operations similar to those of the boosting cells P104 and P304 in the boosting cell sequence L04 at time T5 are performed in the boosting cell P202 and the backflow preventing cell P402 in the boosting cell sequence L02. Briefly, after the charge transfer transistors M1 of the boosting cell P202 and the backflow preventing cell P402 in the boosting cell sequence L02 are set to be in the non-conductive state at time T4, the input/output terminal N202 of the boosting cell P202 and the intermediate terminal N402 of the backflow preventing cell P402 are boosted at time T5. Charges of the input/output terminal N202 whose potential has been increased are transferred via the next boosting cell P302 in the boosting stage ST3 to the input/output terminal N302. Moreover, charges of the input/output terminal N202 of the boosting cell P202 are input to the boosting cell P203 in the next boosting cell sequence L03. Also, similarly, charges of the intermediate terminal N402 of the backflow preventing cell P402 are input to the backflow preventing cell P403 in the next boosting cell sequence L03. Thereby, the OFF-switch transistors M2 of the boosting cell P203 and the backflow preventing cell P403 in the boosting cell sequence L03 are set to be in the conductive state, and the charge transfer transistors M1 are set to be in the non-conductive state.

By transition at time T5, the state return to a state similar to that at time T1. Thus, the boosting operation is repeatedly performed.

The operation of the boosting circuit 100 has been described above. Thus, the boosting operation of each of the boosting cells P101 to P104, P201 to P204, and P301 to P304, and the backflow preventing cells P401 to P404 is performed by repeatedly performing the operations at times T1 to T4. For a boosting cell to be operated, the charge transfer transistor M1 is caused to go from the conductive state to the non-conductive state (boosting standby state) before the boosting operation, and thereafter, boosting is performed (boosting state). After the boosting, the charge transfer transistor M1 is caused to go to the charge transfer state, i.e., return to the boosting standby state.

Therefore, the description of the boosting standby state, the boosting state and the charge transfer state of a single boosting cell can cover the operations of the other boosting cells and backflow preventing cells.

Also, if conditions for the terminal voltages of a boosting cell or a backflow preventing cell in the boosting standby state, the boosting state and the charge transfer state can be clearly defined, it is possible to indicate that the boosting operation can be performed, by indicating that the terminal voltage conditions are satisfied.

Thus, a clock signal to the boosting cell in the boosting standby state, the boosting state and the charge transfer state, and conditions for the voltages of the terminals will be described with reference to FIGS. 3 and 4A to 4D using the boosting cell P301 of the boosting stage ST3 in the boosting cell sequence L01 as a representative example.

Initially, at time T1, in the boosting cell P301 needs to be ready for a boosting operation by causing the charge transfer transistor M1 to go from the conductive state to the non-conductive state. In this case, the clock signal and the terminal voltages are the following.

clock signal=L (CLK1A)
input terminal INPUT=VV2
output terminal OUTPUT=VV2
control signal Sig=VV3 (the voltage VN304 of the input/output terminal N304 of the boosting cell P304)
SourceP=VV3 (the voltage VN303 of the input/output terminal N303 of the boosting cell P303)

Thereby, when the clock signal is at "L", the charge transfer transistor M1 is caused to be in the non-conductive state in the following manner.

1. The OFF-switch transistor M2 is caused to be in the conductive state by satisfying the following.

$V(\text{control signal Sig}) \geq V(\text{INPUT}) + Vtm2$

2. The ON-switch transistor M3 is caused to be in the non-conductive state by satisfying the following.

$V(\text{Source}P) \leq V(\text{Sig}) + |Vtm3|$

If these conditions are satisfied, the gate and the source of the charge transfer transistor M1 can be equalized. Here, Vtm2 is the threshold voltage of the OFF-switch transistor M2, and |Vtm3| is the absolute value of the threshold voltage of the ON-switch transistor M3.

Next, at time T2, in the boosting cell P301, a boosting operation needs to be performed while the charge transfer transistor M1 is held in the non-conductive state. In this case, the clock signal and the terminal voltages are the following.

clock signal=H (CLK1A)
input terminal INPUT=VV1
output terminal OUTPUT=VV3
control signal Sig=VV3 (the voltage VN304 of the input/output terminal N304 of the boosting cell P304)
SourceP=VV2 (the voltage VN303 of the input/output terminal N303 of the boosting cell P303)

Thereby, when the clock signal is at "H", the charge transfer transistor M1 is caused to be in the non-conductive state in the following manner.

1. The OFF-switch transistor M2 is caused to be in the conductive state by satisfying the following.

$V(\text{control signal Sig}) \geq V(\text{INPUT}) + Vtm2$

2. The ON-switch transistor M3 is caused to be in the non-conductive state by satisfying the following.

$V(\text{Source}P) \leq V(\text{Sig}) + |Vtm3|$

If these conditions are satisfied, the gate and the source of the charge transfer transistor M1 can be equalized.

Next, at time T3, in the boosting cell P301, a boosting operation is held while the charge transfer transistor M1 is held in the non-conductive state. In this case, the clock signal and the terminal voltages are the following.

clock signal=H (CLK1A)
input terminal INPUT=VV1
output terminal OUTPUT=VV3
control signal Sig=VV2 (the voltage VN304 of the input/output terminal N304 of the boosting cell P304)
SourceP=VV2 (the voltage VN303 of the input/output terminal N303 of the boosting cell P303)

Thereby, when the clock signal is at "H", the charge transfer transistor M1 is caused to be in the non-conductive state in the following manner.

1. The OFF-switch transistor M2 is caused to be in the conductive state by satisfying the following.

$V(\text{control signal Sig}) \geq V(\text{INPUT}) + Vtm2$

2. The ON-switch transistor M3 is caused to be in the non-conductive state by satisfying the following.

$V(\text{Source}P) \leq V(\text{Sig}) + |Vtm3|$

If these conditions are satisfied, the gate and the source of the charge transfer transistor M1 can be equalized. Voltage conditions when the clock signal is at "H" are the same as those at time T2.

Finally, at time T4, in the boosting cell P301, the charge transfer transistor M1 needs to be caused to go from the non-conductive state to the conductive state, so that charges are transferred from the input terminal INPUT to the output terminal OUTPUT. In this case, the clock signal and the terminal voltages are the following.

clock signal=L (CLK1A)
input terminal INPUT=VV2
output terminal OUTPUT=VV2
control signal Sig=VV2 (the voltage VN304 of the input/output terminal N304 of the boosting cell P304)
SourceP=VV3 (the voltage VN303 of the input/output terminal N303 of the boosting cell P303)

Thereby, when the clock signal is at "L", the charge transfer transistor M1 is caused to be in the conductive state in the following manner.

1. The OFF-switch transistor M2 is caused to be in the non-conductive state by satisfying the following.

$V(\text{control signal Sig}) \leq V(\text{INPUT}) + Vtm2$

2. The ON-switch transistor M3 is caused to be in the non-conductive state by satisfying the following.

$V(\text{Source}P) \geq V(\text{Sig}) + |Vtm3|$

If these conditions are satisfied, the charge transfer transistor M1 can be caused to be in the conductive state.

The boosting operation states of the boosting cell and the backflow preventing cell are summarized in FIG. 5. The boosting operation states include (1) the boosting standby state, (2) the boosting state, and (3) the charge transfer state, and the voltage conditions for the clock signal and the terminals, are as shown in FIG. 5.

Conditions that should be additionally described are the following forbidding conditions and tolerance conditions. Firstly, forbidding conditions for transition in each operation state are voltage conditions under which the source signal SourceP and the input terminal INPUT are short-circuited, so that charges flow from a subsequent stage back to a preceding stage. The conditions are the following.

Forbidding Conditions:

$V(\text{INPUT}) + V tm2 \leq V(\text{Sig}) + |V tm3| \leq V(\text{Source}P)$

Also, there are tolerance conditions under which, during an operation transition, although the gate N1 of the charge transfer transistor M1 goes to the Hiz (high impedance) state, a backflow of charges from the input/output terminal of a subsequent stage to the input/output terminal of a preceding stage. The conditions are the following.

Tolerance Conditions:

$V(\text{INPUT}) = V(\text{Sig}) = V(\text{Source}P)$

Thus, for clock signals to a boosting cell and a backflow preventing cell to be operated, connections for V (Sig) and V (SourceP) may not be limited to those of this embodiment as long as the aforementioned conditions are satisfied. It can be expected that a backflow of charges via the charge transfer transistor M1 can be prevented during a boosting operation.

Note that the configuration of the boosting cell and the backflow preventing cell are only for illustrative purposes. Any configurations that can provide a similar function can be employed. The number of boosting stages is not limited to three and may be any number.

In embodiments below, it will be described that if terminal voltage conditions for boosting cells and backflow preventing cells in the boosting standby state, the boosting state and the charge transfer state are clarified, it is possible to indicate that a boosting operation can be performed, by indicating that the terminal voltage conditions are satisfied.

<Effect>

As described above, four clock signals are applied to four boosting cell sequences arranged in parallel (M=4). A boosting cell in a K-th sequence (1≦K≦M) is connected to the output terminal of a boosting cell in a (K−1)-th sequence (the (K−1)-th sequence=the M-th sequence when (K−1)=0), and depending on the potential of the output terminal of the boosting cell in the (K−1)-th sequence, the voltage of the input terminal of the boosting cell in the K-th sequence and the voltage of the output terminal of a boosting cell in a KB-th sequence operating at a phase different by about 180 degrees (KB=(M/2+K) when K≦M/2, and KB=(K−M/2) when K>M/2) are switched and controlled, thereby making it possible to cause the charge transfer transistor to be in the non-conductive state during a boosting operation without using a complicated clock, so that a decrease in boosting efficiency can be suppressed.

Second Embodiment

Configuration

Figure 6:
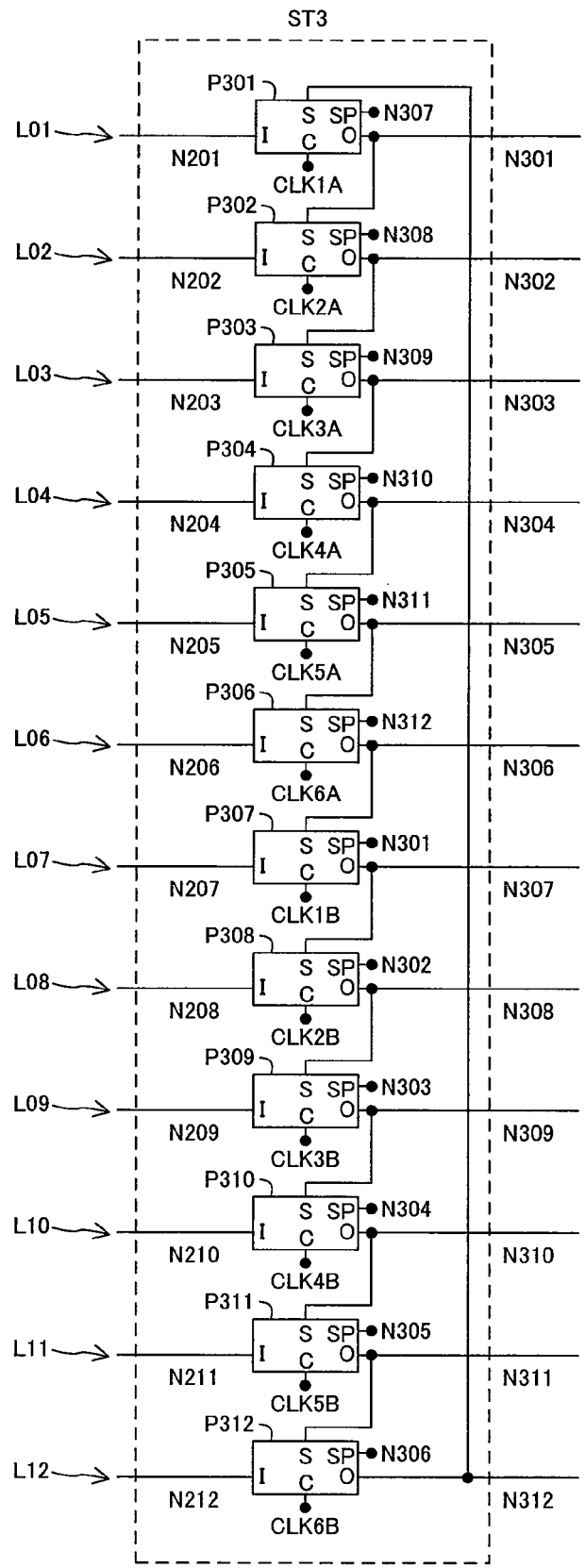
FIG. 6 is a block diagram showing a boosting circuit according to a second embodiment of the present invention.

FIG. 6 shows a boosting circuit 200 according to a second embodiment of the present invention. FIG. 6 shows a circuit block corresponding to the third boosting stage ST3 of the boosting circuit 100 of FIG. 1. The circuit block is different from the boosting stage ST3 of the boosting circuit 100 in that the number of boosting cell sequences arranged in parallel is changed from 4 to 12 (boosting cell sequences L01 to L12, and boosting cells P301 to P312). In this case, the boosting cells P301 to P312 include input/output terminals N201 to N212 and N301 to N312. The boosting cells P301 to P312 repeatedly perform a boosting operation in synchronization with clock signals CLK1A to CLK6A and CLK1B to CLK6B. A boosting cell sequence that performs a boosting operation in synchronization with the clock signal CLK1A is assumed to be the first sequence (L01). Boosting cell sequences that perform a boosting operation in synchronization with the clock signals CLK2A to CLK6A are assumed to be the second to sixth sequences (L02 to L06), respectively. Boosting cell sequences that perform a boosting operation in synchronization with the clock signals CLK1B to CLK6B are assumed to be the seventh to twelfth sequences (L7 to L12), respectively. Note that the clock signals CLK1A and CLK1B have complementary amplitudes, and similarly, each of pairs of CLK2A and CLK2B, CLK3A and CLK3B, CLK4A and CLK4B, CLK5A and CLK5B, and CLK6A and CLK6B has a complementary relationship.

Figure 8:
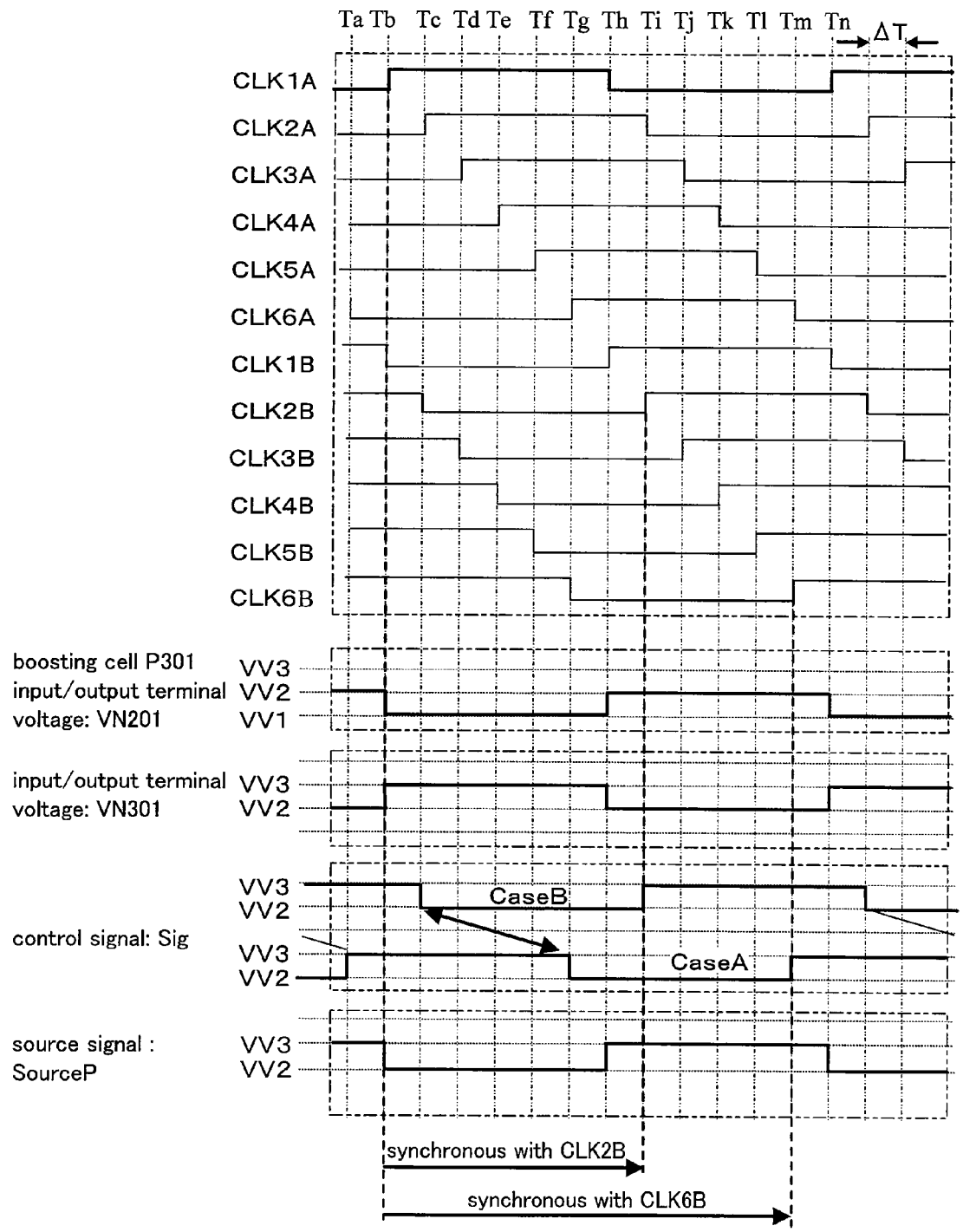
FIG. 8 is a waveform diagram for describing operations of the boosting circuits of FIGS. 6 and 7.

FIG. 8 shows operation waveforms of the boosting circuit 200 having twelve boosting cell sequences arranged in parallel. As described in the first embodiment, since the boosting cells and the backflow preventing cell have similar operation states, an operation of the boosting circuit 200 will be described, illustrating, as a representative example, the boosting cell P301 that repeatedly performs a boosting operation in synchronization with the clock signal CLK1A. Here, in FIG. 8, the control signal Sig is the voltage of the input/output terminal N312 of the boosting cell P312 in the boosting cell sequence L12 that repeatedly performs a boosting operation in synchronization with the clock signal CLK6B (CaseA is applied). The source signal SourceP is the voltage of the input/output terminal N307 of the boosting cell P307 in the boosting cell sequence L07 that repeatedly performs a boosting operation in synchronization with the clock signal CLK1B.

Note that, in the boosting circuit 200 having M boosting cell sequences (M=12), a boosting cell in a K-th sequence (1≦K≦M) is connected to one corresponding to a (K−1)-th sequence of the input/output terminals N301 to N312 of the boosting cells P301 to P312 (the (K−1)-th sequence=the M-th sequence when (K−1)=0), and performs a boosting operation by switching the voltage of the input terminal INPUT of the boosting cell in the K-th sequence, and the voltage of the output terminal of a boosting cell in a KB-th sequence (KB=(M/2+K) when K≦M/2, and KB=(K−M/2) when K>M/2) that operates at a phase different by about 180 degrees, depending on one corresponding to the (K−1)-th sequence of the potentials of the input/output terminals N301 to N312 of the boosting cells P301 to P312.

<Operation>

As described in FIG. 5 of the first embodiment, an operation waveform of FIG. 8 (control signal: Sig is CaseA) can be used to divide operation states synchronous with the clock signal CLK1A of the boosting circuit 200 into a boosting standby state, a boosting state, and a charge transfer state.

At time Ta, the clock signal CLK1A is at "L", and the following is satisfied.

$V(\text{control signal Sig}) = VV3 > V(\text{INPUT}) = VV2$ $V(\text{Source}P) = VV3 = V(\text{Sig}) = VV3$ Therefore, the boosting cell is in the boosting standby state at time Ta.

Next, at time Tb, the clock signal CLK1A is at "H", and the following is satisfied.

$V(\text{control signal Sig}) = VV3 > V(\text{INPUT}) = VV1$ $V(\text{Source}P) = VV2 < V(\text{Sig}) = VV3$ Therefore, the boosting cell is in the boosting state at time Tb.

At time Tg, the clock signal CLK6B goes from "H" to "L", and the following is satisfied.

$V(\text{control signal Sig}) = VV2 > V(\text{INPUT}) = VV1$ $V(\text{Source}P) = VV2 = V(\text{Sig}) = VV2$ The boosting cell is held in the boosting state.

Next, at time Th, the clock signal CLK1A goes from "H" to "L", and the following is satisfied.

$V$(control signal Sig)=$VV2$=$V$(INPUT)=$VV2$ $V$(Source$P$)=$VV3$>$V$(Sig)=$VV2$ The boosting cell goes to the charge transfer state.

Next, at time Tm, the boosting cell goes to the same state as that at time Ta, i.e., the boosting standby state.

In this case, as compared to (clock signal cycle/4) that is the charge transfer time of the first embodiment, the charge transfer time can be increased, i.e., (clock signal cycle×5/12), so that an increase in layout size of the charge transfer transistor can be suppressed.

Although it has been assumed above that there are twelve boosting cell sequences arranged in parallel, the use of 2N+4 (N≧0) (e.g., 4, 6, 8, etc.) boosting cell sequences arranged in parallel as also shown in the first embodiment can be expected to have a similar effect. Also, the number of boosting stages in the boosting circuit 200 is not limited to three and may be any number.

<Effect>

By increasing the number of boosting cell sequences, the charge transfer time can be increased, so that the layout size of the charge transfer transistor can be suppressed.

Third Embodiment

Configuration

Figure 7:
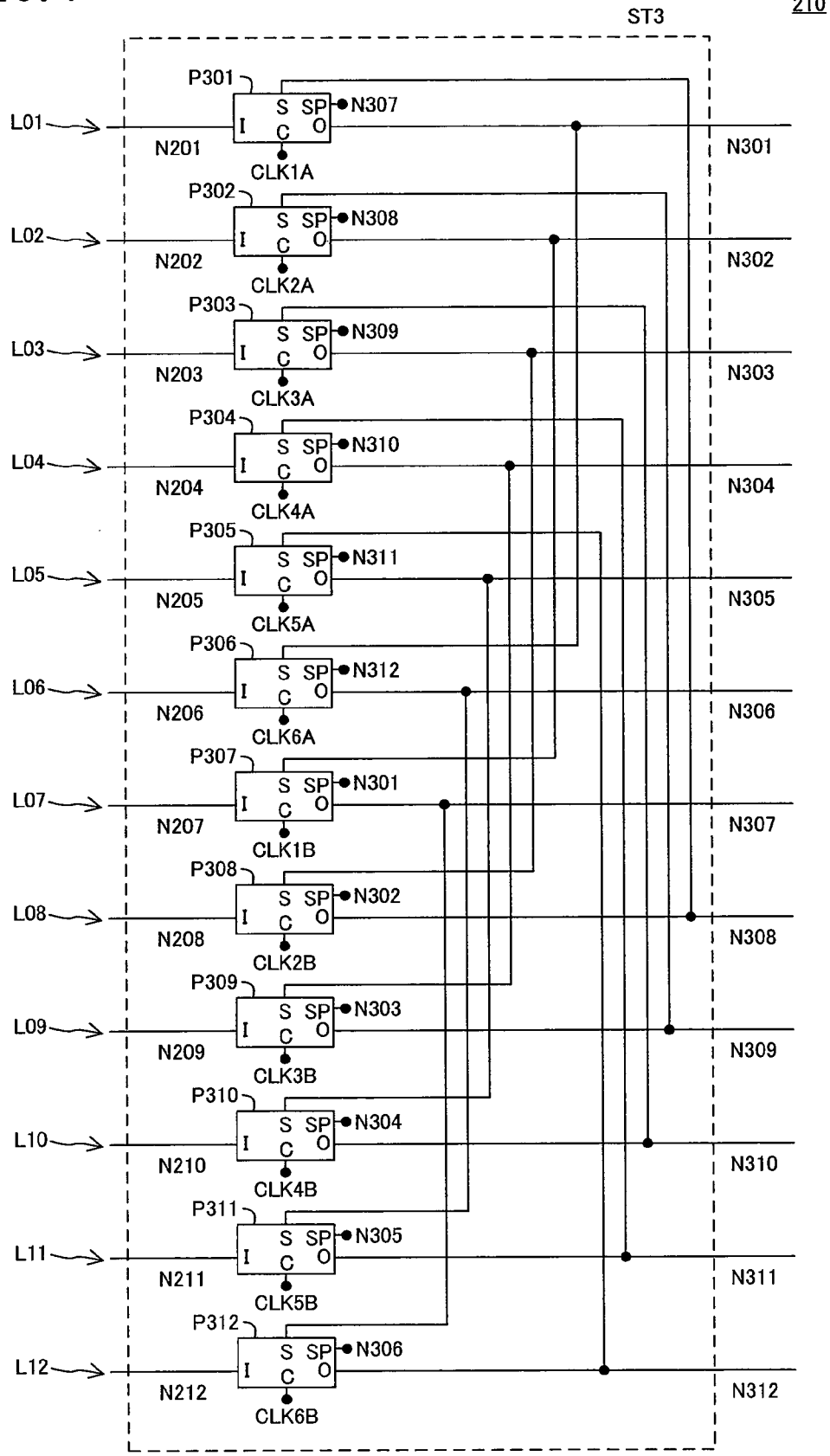
FIG. 7 is a block diagram showing a boosting circuit according to a third embodiment of the present invention.

FIG. 7 shows a boosting circuit 210 according to a third embodiment of the present invention. FIG. 7 shows a variation of the boosting circuit 200 of FIG. 6. The variation is different from the boosting circuit 200 in that, as the control signal Sig for the boosting cell P301, the input/output terminal N308 of the boosting cell P308 in the boosting cell sequence L08 that repeatedly performs a boosting operation in synchronization with the clock signal CLK2B is connected (in FIG. 8, CaseB is applied in the control signal Sig).

Also, regarding the other boosting cells, in M boosting cell sequences arranged in parallel (M=12), a boosting cell in a K-th sequence (1≦K≦M) performs a boosting operation by switching the voltage of the input terminal INPUT of the boosting cell in the K-th sequence, and the voltage of the output terminal of a boosting cell in a KB-th sequence (KB=(M/2+I) when K≦M/2, and KB=(I−M/2) when K>M/2) operating at a phase different by about 180 degrees, depending on the potentials of the input/output terminals N301 to N312 of the boosting cells P301 to P312 in a KA-th sequence (KA=(K−A) when (K−A)>0, and KA=(M−|K−A|) when (K−A)≦0) located A sequences before the K-th sequence (A=M/2−1=5).

Note that, as in the second embodiment, an operation of the boosting circuit 210 will be described, illustrating, as a representative example, the boosting cell P301 that repeatedly performs a boosting operation in synchronization with the clock signal CLK1A.

<Operation>

As described in FIG. 5 of the first embodiment, an operation waveform of FIG. 8 (control signal: Sig is CaseB) can be used to divide operation states of the boosting cell P301 synchronous with the clock signal CLK1A of the boosting circuit 210 into a boosting standby state, a boosting state, and a charge transfer state.

At time Ta, the clock signal CLK1A is at "L", and the following is satisfied.

$V$(control signal Sig)=$VV3$>$V$(INPUT)=$VV2$ $V$(Source$P$)=$VV3$=$V$(Sig)=$VV3$ At time Ta, the boosting cell is in the boosting standby state.

Next, at time Tb, the clock signal CLK1A is at "H", and the following is satisfied.

$V$(control signal Sig)=$VV3$>$V$(INPUT)=$VV1$ $V$(Source$P$)=$VV2$<$V$(Sig)=$VV3$ Therefore, at time Tb, the boosting cell is in the boosting state.

At time Tc, although the clock signal CLK2B goes from "H" to "L", the following is satisfied.

$V$(control signal Sig)=$VV2$>$V$(INPUT)=$VV1$ $V$(Source$P$)=$VV2$=$V$(Sig)=$VV2$ Therefore, the boosting cell is held in the boosting state.

Next, at time Th, the clock signal CLK1A goes from "H" to "L", and the following is satisfied.

$V$(control signal Sig)=$VV2$=$V$(INPUT)=$VV2$ $V$(Source$P$)=$VV3$>$V$(Sig)=$VV2$ Thus, the boosting cell goes to the charge transfer state.

Next, at time Tm, the boosting cell goes to the same state as that at time Ta, i.e., the boosting standby state.

Thus, the charge transfer time is (clock signal cycle×1/12), i.e., the charge transfer time is reduced.

According to the second and third embodiments, the control signal Sig of the boosting cell P301 that performs a boosting operation in synchronization with the clock signal CLK1A can be connected to the output terminal OUTPUT of a boosting cell that performs a boosting operation in synchronization with the clock signals CLK6B to CLK4B to CLK2B, so that the charge transfer time can be adjusted from (clock signal cycle×1/12) to (clock signal cycle×5/12) (the voltage conditions for a boosting cell described in the first embodiment are satisfied).

Specifically, when there are M boosting cell sequences (M≧4) arranged in parallel, the charge transfer transistor M1 of a boosting cell in a K-th sequence (1≦K≦M) can be controlled, depending on the potential of the output terminal OUTPUT of a boosting cell in a KA-th sequence located A sequences (1≦A≦M/2−1) before the K-th sequence (KA=(K−A) when (K−A)>0, and KA=(M−|K−A|) when (K−A)≦0), and the charge transfer time can be adjusted under a predetermined constraint.

As the number M of boosting cell sequences increases, the time difference ΔT between each clock signal decreases, so that a time required for transition from the boosting standby state to the boosting state decreases. Thereby, it is difficult to set the charge transfer transistor M1 to be sufficiently in the non-conductive state. This problem is solved by arbitrarily changing the output terminal of a boosting cell to which the control signal Sig is connected (setting A) to set an optimal time for the boosting standby state, and a sufficient charge transfer time.

<Effect>

When there are M boosting cell sequences (M≧4) arranged in parallel, then if the control signal Sig of a boosting cell in a K-th sequence is connected to the output terminal OUTPUT of a boosting cell located A sequences (1≦A≦M/

2-1) before the K-th sequence, an optimal time for the boosting standby state can be set and a sufficient charge transfer time can be adjusted, for a charge transfer transistor.

Fourth Embodiment

Configuration

Figure 9:
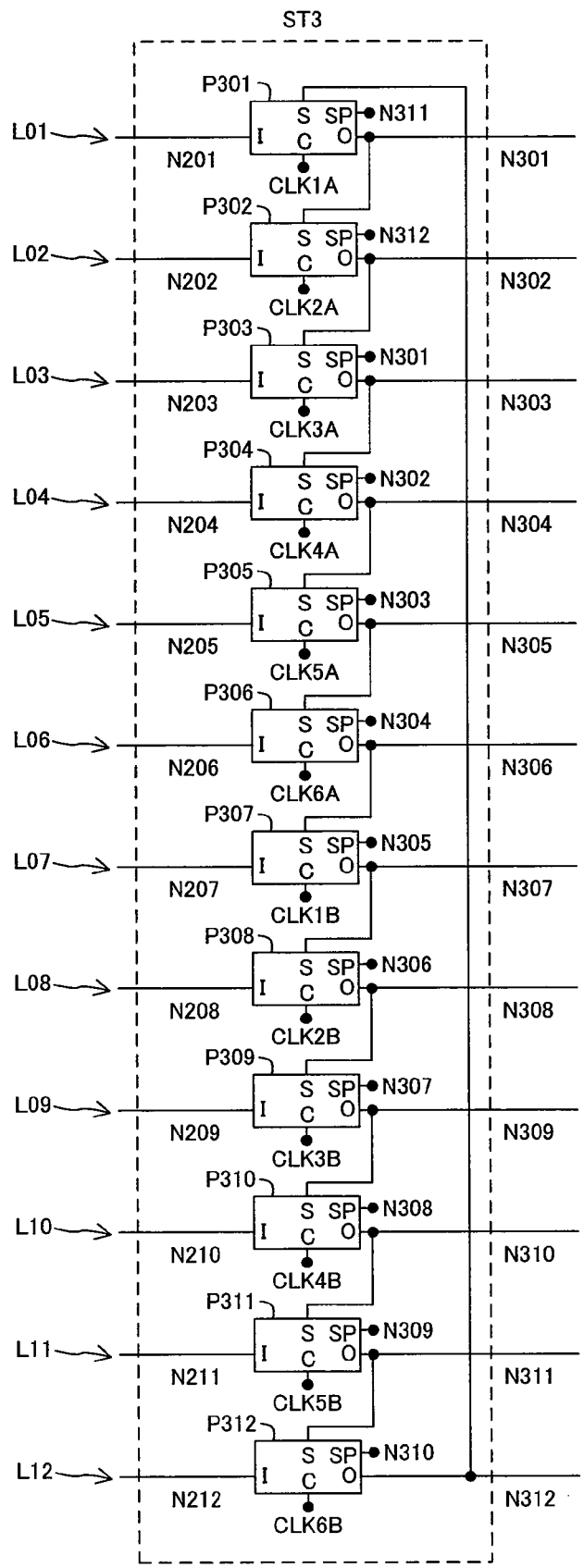
FIG. 9 is a block diagram showing a boosting circuit according to a fourth embodiment of the present invention.

FIG. 9 shows a boosting circuit 220 according to a fourth embodiment of the present invention. FIG. 9 shows a variation of the boosting circuit 200 of FIG. 6. The variation is different from the boosting circuit 200 in that the input/output terminal N311 of the boosting cell P311 in the boosting cell sequence L11 that performs a boosting operation in synchronization with the clock signal CLK5B is connected to the source signal SourceP of the boosting cell P301.

Also, regarding the other boosting cells, in the M boosting cell sequences (M=12) arranged in parallel, the source signal SourceP of a boosting cell in a K-th sequence ($1 \leq K \leq M$) may be connected to the output terminal OUTPUT of a boosting cell in a KB-th sequence (KB=(K−B) when (K−B)>0, and KB=(M−|K−B|) when (K−B)≤0) located B sequences ($A < B \leq M/2$: A has a value described in the third embodiment) before the K-th sequence. In the boosting circuit 220, a case where B=2 will be described as an example.

<Operation>

Figure 10:
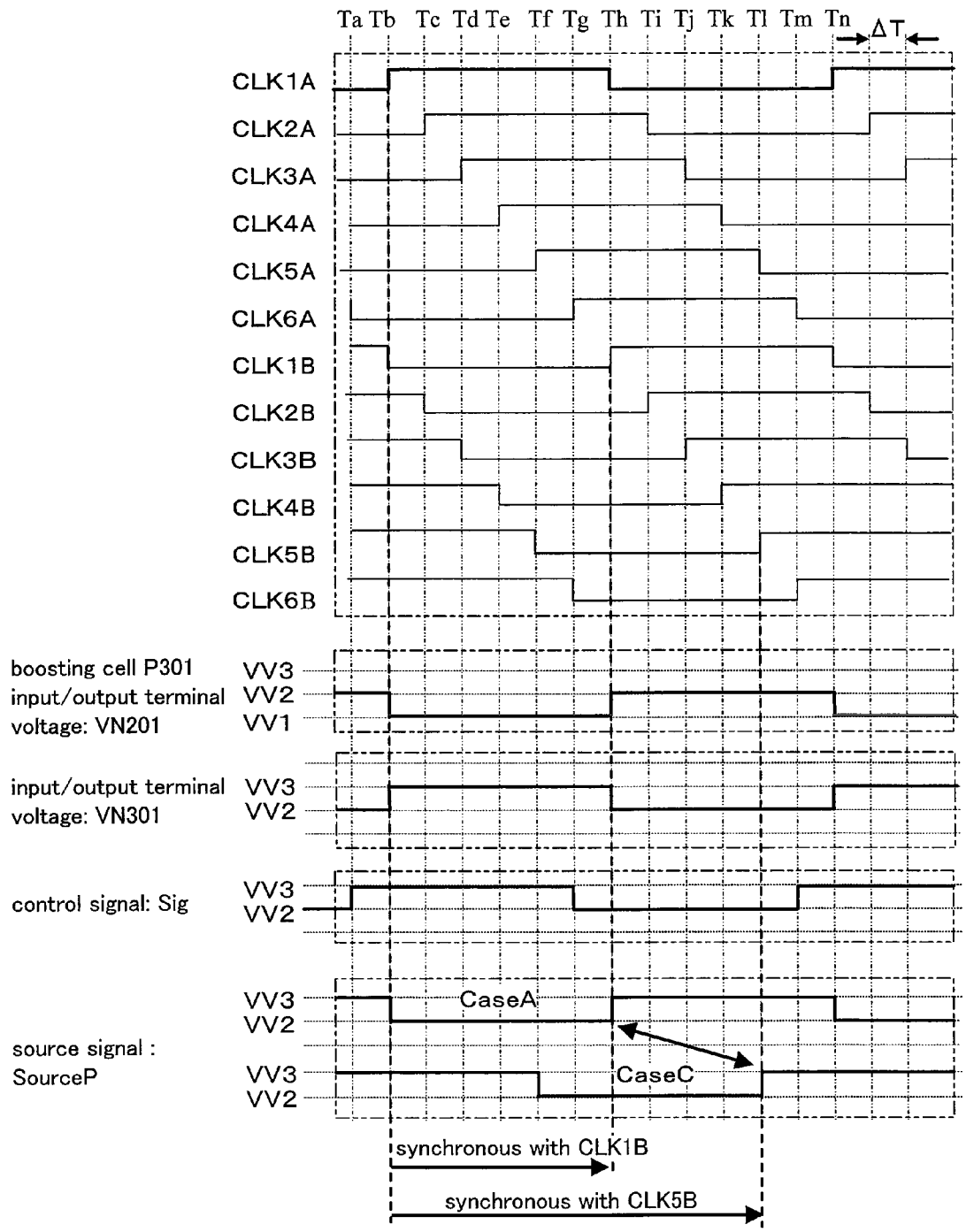
FIG. 10 is a waveform diagram for describing an operation of the boosting circuit of FIG. 9.

As described in FIG. 5 of the first embodiment, an operation waveform of FIG. 10 (the source signal SourceP is CaseC) can be used to divide operation states of the boosting cell P301 synchronous with the clock signal CLK1A of the boosting circuit 220 into a boosting standby state, a boosting state, and a charge transfer state.

Note that CaseA of FIG. 10 indicates the operation waveform of the boosting circuit 200 described in the second embodiment.

At time Ta, the clock signal CLK1A is at "L", and the following is satisfied.

$V$(control signal Sig)=$VV3$>$V$(INPUT)=$VV2$ $V$(SourceP)=$VV3$=$V$(Sig)=$VV3$ Therefore, at time Ta, the boosting cell is in the boosting standby state.

Next, at time Tb, the clock signal CLK1A is at "H", and the following is satisfied.

$V$(control signal Sig)=$VV3$>$V$(INPUT)=$VV1$ $V$(SourceP)=$VV3$=$V$(Sig)=$VV3$ Therefore, at time Tb, the boosting cell is in the boosting state.

At time Tf, although the clock signal CLK5B goes from "H" to "L", the following is satisfied.

$V$(control signal Sig)=$VV3$>$V$(INPUT)=$VV1$ $V$(SourceP)=$VV2$=$V$(Sig)=$VV3$ Therefore, the boosting cell is held in the boosting state.

Next, at time Th, the clock signal CLK1A goes from "H" to "L", and the following is satisfied.

$V$(control signal Sig)=$VV2$=$V$(INPUT)=$VV2$ $V$(SourceP)=$VV2$=$V$(Sig)=$VV2$ Therefore, the gate N1 of the charge transfer transistor M1 becomes Hiz. However, a backflow of charges from a boosting cell in a subsequent stage to a boosting cell in a preceding stage does not occur.

Next, at time T1, the clock signal CLK5B goes from "L" to "H", and the following is satisfied.

$V$(control signal Sig)=$VV2$=$V$(INPUT)=$VV2$ $V$(SourceP)=$VV3$>$V$(Sig)=$VV2$ Therefore, the boosting cell goes to the charge transfer state.

Next, at time Tm, the boosting cell goes to the same stage as that at time Ta, i.e., the boosting standby state.

Therefore, the gate N1 of the charge transfer transistor M1 becomes Hiz before going to the charge transfer state. However, a backflow of charges from a boosting cell in a subsequent stage to a boosting cell in a preceding stage via the charge transfer transistor M1 does not occur.

According to the second and fourth embodiments, the source signal SourceP of the boosting cell P301 that performs a boosting operation in synchronization with the clock signal CLK1A can be connected to the output terminal OUTPUT of a boosting cell that performs a boosting operation in synchronization with the clock signals CLK5B to CLK3B to CLK1B (voltage conditions for a boosting cell described in the first embodiment are satisfied).

The clock signal CLK5B drives a boosting cell sequence located two sequences before CLK1A, and the clock signal CLK1B drives a boosting cell sequence located six sequences before CLK1A.

If the deviation amount of a clock signal from CLK1A is represented by B, CLK5B is A=2 and CLK2B=6=M/2.

Here, in order to keep the voltage conditions of FIG. 5, the source signal SourceP needs to be synchronized with a boosting cell sequence located one or more sequences before the control signal Sig.

Thus, when there are M boosting cell sequences ($M \geq 4$) arranged in parallel, a boosting cell in a K-th sequence ($1 \leq K \leq M$) can repeatedly perform a boosting operation by switching the voltage of the input terminal INPUT of the boosting cell in the K-th sequence, and the voltage of the output terminal OUTPUT of a boosting cell in a KB-th sequence (KB=(K−B) when (K−B)>0, and (M−|K−B|) when (K−B)≤0) located B sequences ($A+1 \leq B \leq M/2$) before the K-th sequence, depending on the potential of the output terminal OUTPUT of a boosting cell in a KA-th sequence (KA=(K−A) when (K−A)>0, and KA=(M−|K−A|) when (K−A)≤0) located A sequences ($1 \leq A \leq M/2-1$) before the K-th sequence.

<Effect>

When there are M boosting cell sequences ($M \geq 4$) arranged in parallel, a boosting cell in a K-th sequence ($1 \leq K \leq M$) can perform a boosting operation while suppressing a backflow via a charge transfer transistor.

Fifth Embodiment

Configuration

Figure 11:
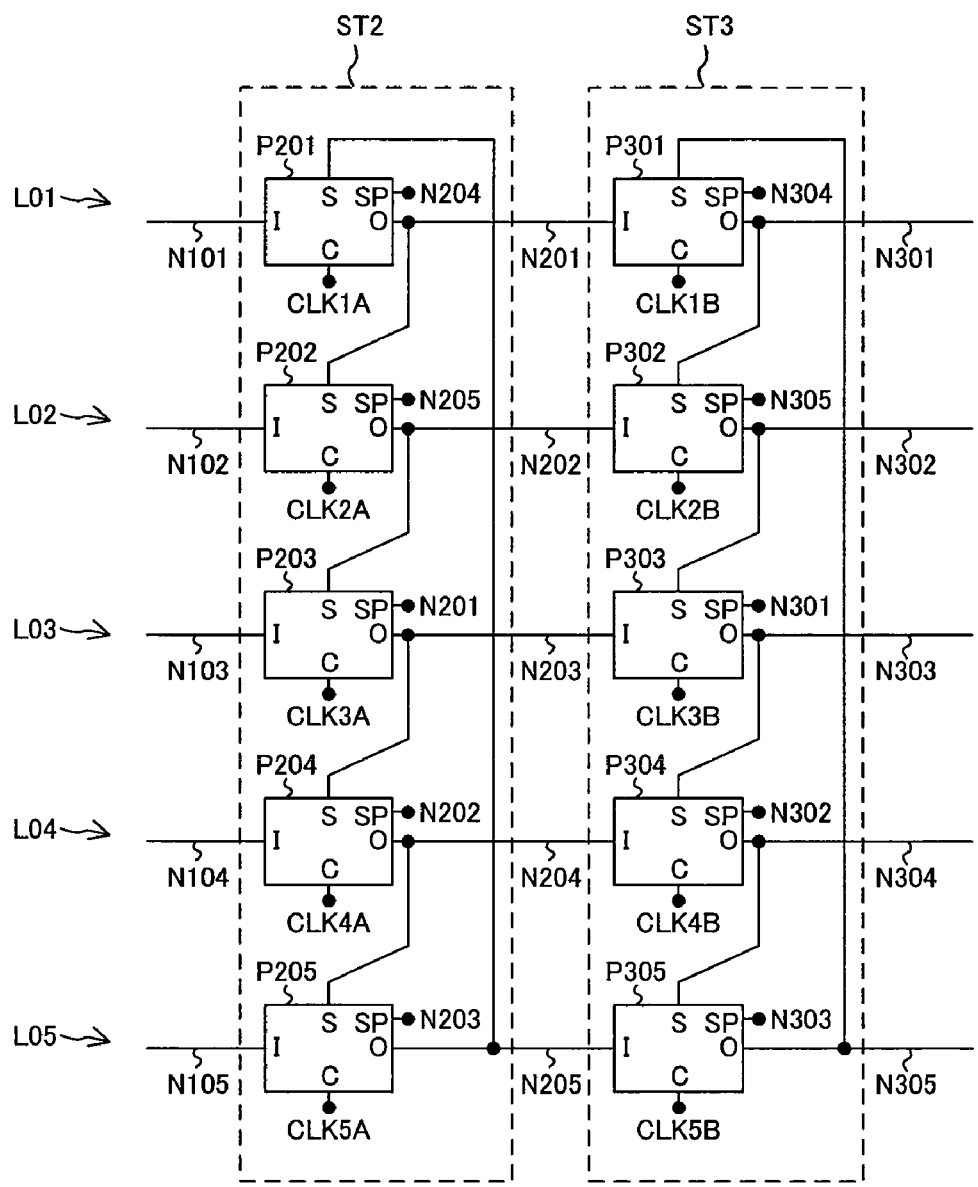
FIG. 11 is a block diagram showing a boosting circuit according to a fifth embodiment of the present invention.

FIG. 11 shows a boosting circuit 230 according to a fifth embodiment of the present invention. Boosting circuits each having even-numbered ((2N+4)-th ($N \geq 0$)) sequences have been described above. Here, the boosting circuit 230 that includes five boosting cell sequences (M=5) arranged in parallel will be described, where five is the smallest odd number that satisfies a constraint on the set value A ($1 \leq A \leq M/2-1$).

The boosting circuit 230 is a variation of the boosting circuit 100 of FIG. 1. The variation is different from the boosting circuit 100 in that boosting cells P205 and P305 in a boosting cell sequence L05 are added. Here, clock signals CLK1A to CLK5A are input to the boosting cells P201 to P205 in the even-numbered boosting stage ST2, respectively, where the clock signals CLK1A to CLK5A have a phase difference of 360/5=72 degrees between each other. Also, clock signals CLK1B to CLK5B that are inversions of the clock signals CLK1A to CLK5A are input to the boosting cells P301 to P305 in the odd-numbered boosting stage ST3, respectively. Here, a boosting operation will be described using the boosting cell P301.

The voltage VN305 (control signal Sig) of the input/output terminal N305 of the boosting cell P305 that performs a boosting operation in synchronization with the clock signal CLK5B, and the voltage VN304 (source signal SourceP) of the input/output terminal N304 of the boosting cell P304 that performs a boosting operation in synchronization with the clock signal CLK4B, are input to the boosting cell P301.

<Operation>

Figure 12:
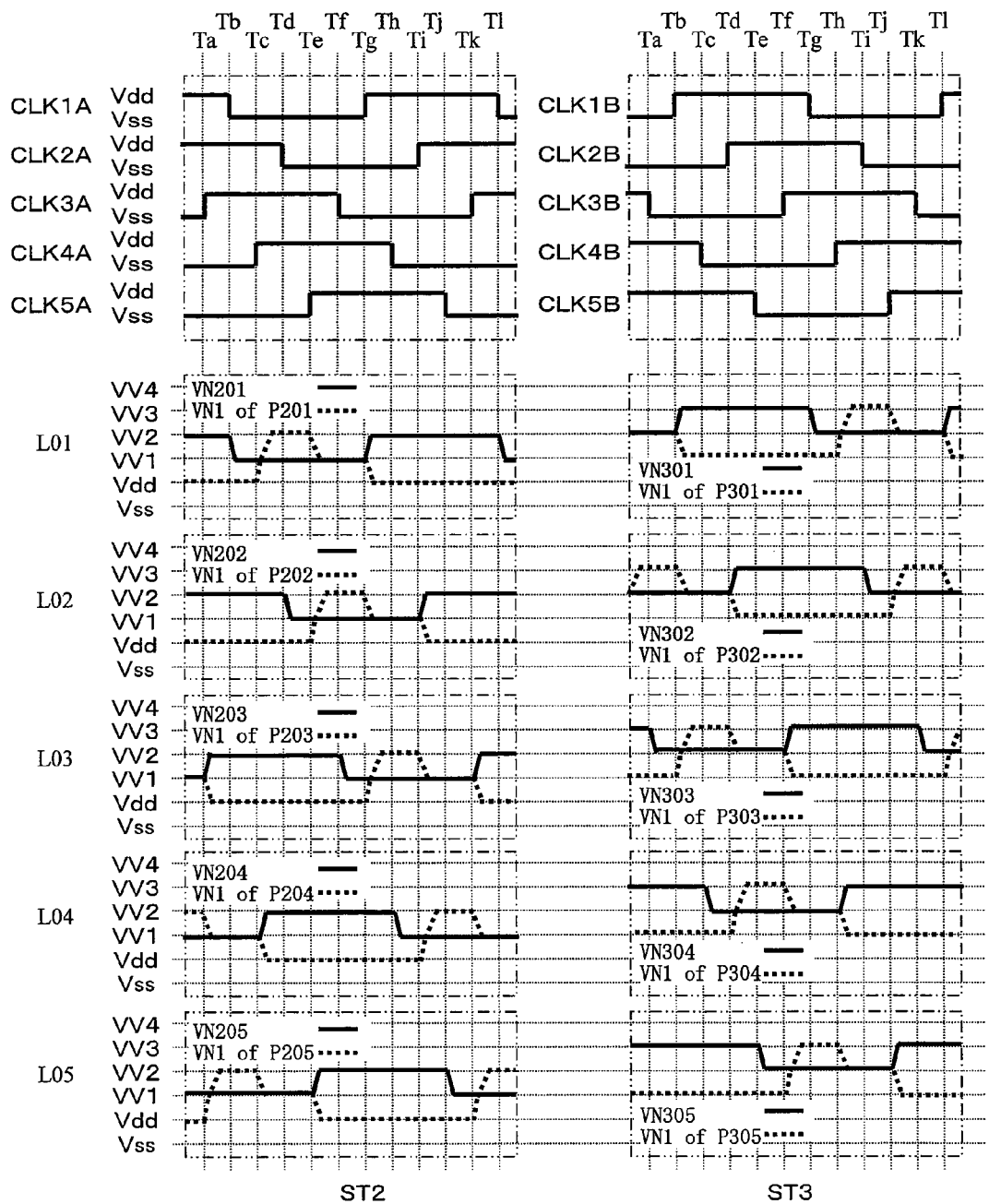
FIG. 12 is a waveform diagram for describing an operation of the boosting circuit of FIG. 11.

As described in FIG. 5 of the first embodiment, an operation waveform of FIG. 12 can be used to divide operation states of the boosting cell P301 synchronous with the clock signal CLK1B of the boosting circuit 230 into a boosting standby state, a boosting state, and a charge transfer state.

At time Ta, the clock signal CLK1B is at "L", and the following is satisfied.

$V(\text{control signal Sig}=N305)=VV3>V(\text{INPUT})=VV2$ $V(\text{Source}P=N304)=VV3=V(\text{Sig})=VV3$ Therefore, at time Ta, the boosting cell is in the boosting standby state.

Next, at time Tb, the clock signal CLK1B is at "H", and the following is satisfied.

$V(\text{control signal Sig}=N305)=VV3>V(\text{INPUT})=VV1$ $V(\text{Source}P=N304)=VV3=V(\text{Sig})=VV3$ Therefore, at time Tb, the boosting cell is in the boosting state.

At time Tc, although the clock signal CLK4B goes from "H" to "L", the following is satisfied.

$V(\text{control signal Sig}=N305)=VV3>V(\text{INPUT})=VV1$ $V(\text{Source}P=N304)=VV2<V(\text{Sig})=VV3$ Therefore, the boosting cell is held in the boosting state.

Next, at time Te, the clock signal CLK5B goes from "H" to "L", and the following is satisfied.

$V(\text{control signal Sig}=N305)=VV2>V(\text{INPUT})=VV1$ $V(\text{Source}P=N304)=VV2=V(\text{Sig})=VV2$ Therefore, the boosting cell is held in the boosting state.

Next, at time Tg, the clock signal CLK1B goes from "H" to "L", and the following is satisfied.

$V(\text{control signal Sig}=N305)=VV2=V(\text{INPUT})=VV2$ $V(\text{Source}P=N304)=VV2=V(\text{Sig})=VV2$ Therefore, the gate N1 of the charge transfer transistor M1 becomes Hiz. However, a backflow of charges from a boosting cell in a subsequent stage to a boosting cell in a preceding stage does not occur.

Next, at time Th, the clock signal CLK4B goes from "L" to "H", and the following is satisfied.

$V(\text{control signal Sig}=N305)=VV2=V(\text{INPUT})=VV2$ $V(\text{Source}P=N304)=VV3>V(\text{Sig})=VV2$ Therefore, the boosting cell goes to the charge transfer state.

Next, at time Tk, the boosting cell goes to the same state as that at time Ta, i.e., the boosting standby state.

Thus, it is clear that a boosting operation can be performed even when there are five boosting cell sequences arranged in parallel. Note that it is clear that if there are (2N+5) boosting cell sequences (odd number, N≧0), a similar operation can be performed. In addition, in view of this and the aforementioned embodiments, if a boosting circuit includes four or more boosting cell sequences (M≧4) arranged in parallel, a similar boosting circuit can be obtained. Also, even for a boosting circuit having an odd number of boosting cell sequences, conditions for the control signal Sig and the source signal SourceP of each boosting cell are applicable as in the third and fourth embodiments.

<Effect>

When there are M boosting cell sequences (M≧5, an odd number of sequences) arranged in parallel, a boosting cell in a K-th sequence (1≦K≦M) can perform a boosting operation while suppressing a backflow via a charge transfer transistor.

Sixth Embodiment

Figure 13A:
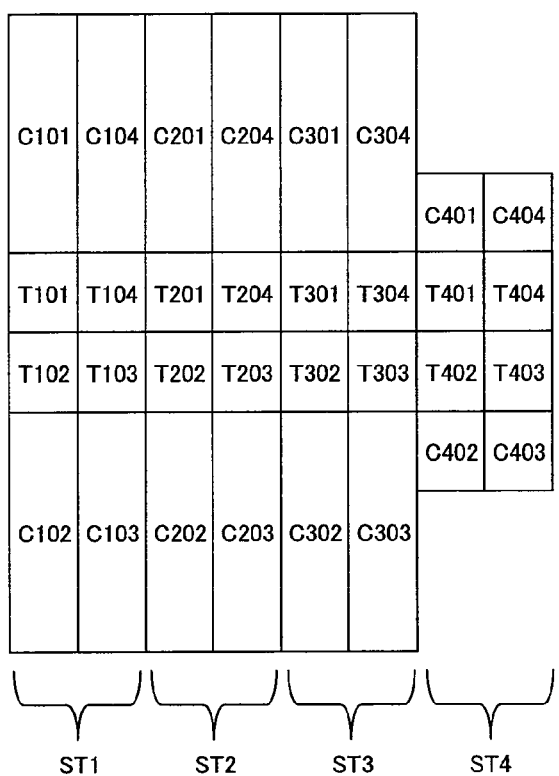
FIGS. 13A and 13B are diagrams showing a layout configuration of a boosting circuit according to a sixth embodiment of the present invention.
Figure 13B:
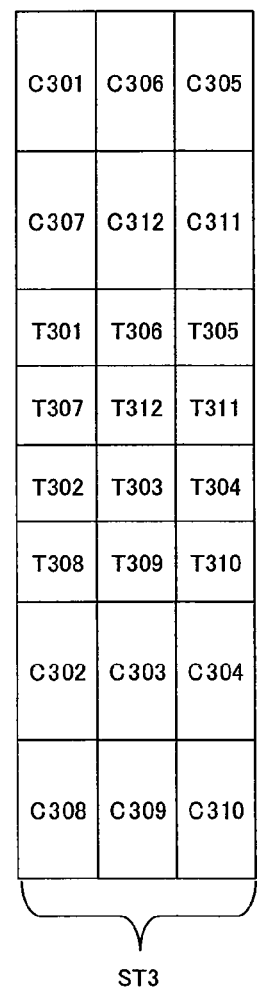

FIG. 13A is a plan view showing an exemplary layout configuration of the boosting circuit 100 of FIG. 1. The boosting cell P101 includes T101 (a charge transfer transistor and a state control unit: an ON-switch transistor and an OFF-switch transistor), and C101 (a boosting capacitance). Each boosting cell is similarly configured. FIG. 13B shows the boosting stage ST3 of the boosting circuit 200 of FIG. 6 as a representative example.

As can be seen from FIG. 13A, the boosting stages ST1, ST2 and ST3, and the backflow preventing circuit ST4 are arranged so that the boosting cells in the boosting cell sequence L01 and the boosting cells in the boosting cell sequence L04 are alternately arranged, and similarly, the boosting cells in the boosting cell sequence L02 and the boosting cells in the boosting cell sequence L03 are alternately arranged. Thereby, T101 to T104 (charge transfer transistors and state control units) included in the boosting cells P101 to P104 can be arranged close to each other, so that an increase in wiring extension between each boosting cell can be suppressed, and a margin of timing during a boosting operation can be ensured. Similarly, T201 to T204, T301 to T304, and T401 to T404 (charge transfer transistors and state control units) included in the boosting cells P201 to P204 and P301 to P304, and the backflow preventing cells P401 to P404 can also be arranged close to each other.

As can be seen from FIG. 13B, the boosting stage ST3 is configured so that the boosting cells in the three boosting cell sequences L01, L06 and L05 arranged in parallel are sequentially arranged, and similarly, the boosting cell sequences L07, L12 and L11, the boosting cell sequences L02, L03 and L04, and the boosting cell sequences L08, L09 and L10 are sequentially arranged. Therefore, T301 to T312 (charge transfer transistors and state control units) can be arranged close to each other, so that an increase in wiring extension between each boosting cell can be suppressed, and a margin of timing during a boosting operation can be ensured.

In other words, by providing a boosting cell other than that in a K-th sequence (1≦K≦M) between a boosting cell in an I-th stage (I≧1) and a boosting cell in (I+1)-th stage, in the K-th sequence, an increase in wiring extension between each boosting cell can be suppressed, and a margin of timing during a boosting operation can be ensured.

Moreover, by providing a boosting cell other than those in a K-th sequence (1≦K≦M) and a J-th sequence (1≦J≦M, J≠K) between a boosting cell in an I-th stage (I≧1) and in the K-th sequence and a boosting cell in an I-th stage (I≧1) and in the J-th sequence, an increase in wiring extension between each boosting cell can be suppressed, and a margin of timing during a boosting operation can be ensured.

Note that a charge transfer transistor, a state control unit and a boosting capacitance included in a boosting cell do not need to be arranged close to each other.

The aforementioned effect can be expected if, of a charge transfer transistor, a state control unit and a boosting capacitance included in a boosting cell, the charge transfer transistor and the state control unit satisfy the aforementioned conditions.

Seventh Embodiment

Figure 14:
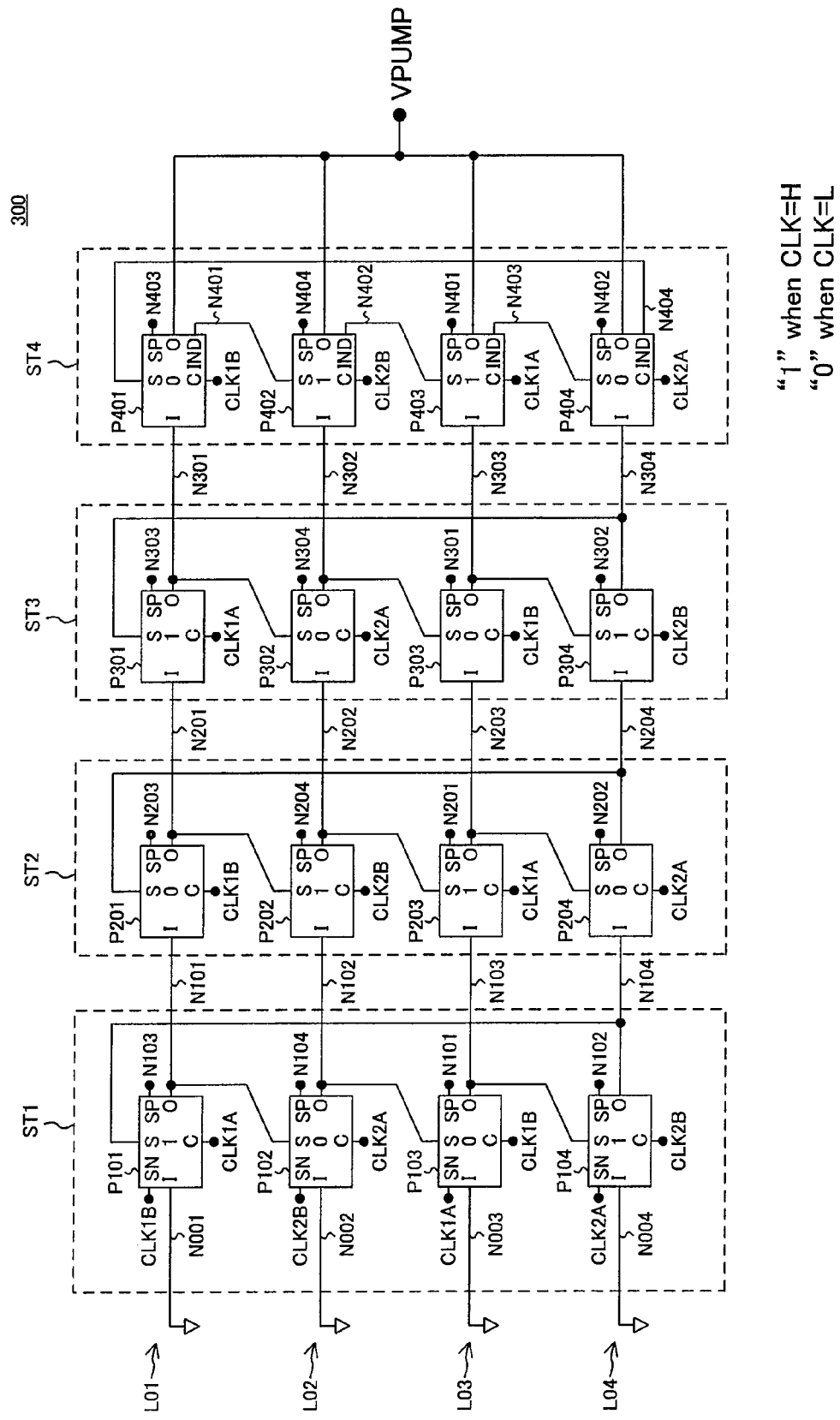
FIG. 14 is a block diagram showing a boosting circuit according to a seventh embodiment of the present invention.
Figure 15A:
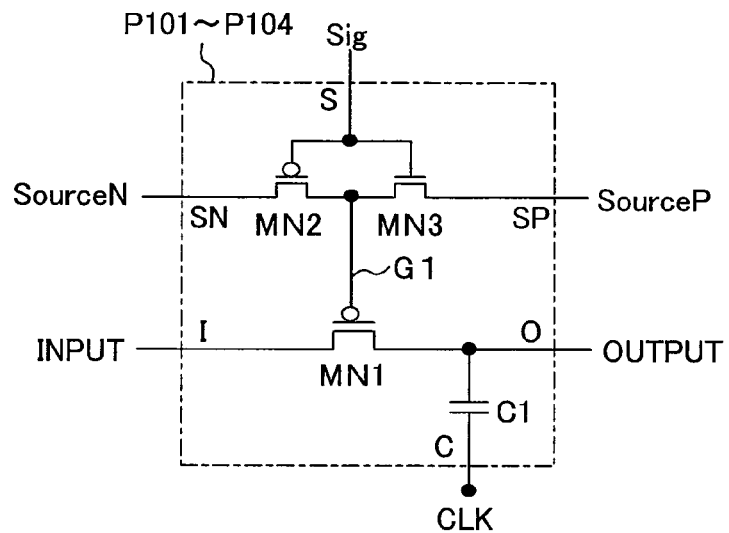
FIGS. 15A, 15B and 15C are circuit diagrams showing configurations of a boosting cell and a backflow preventing cell of FIG. 14.
Figure 15B:
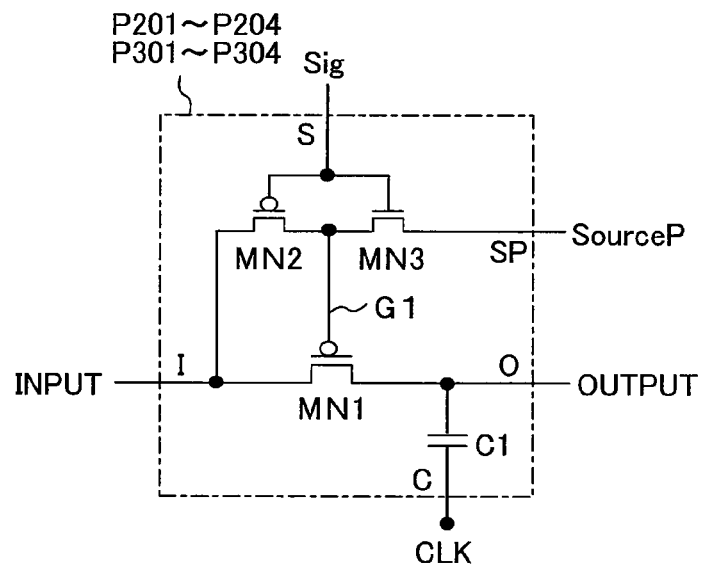
Figure 15C:
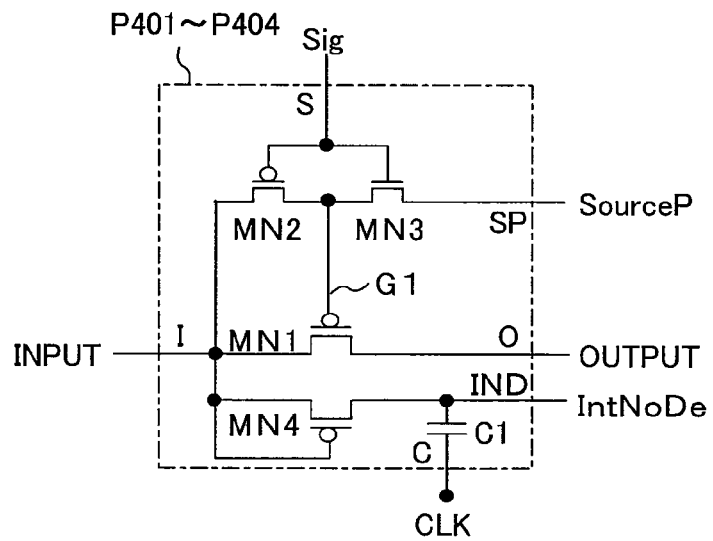

Although it has been assumed in the embodiments above that, for example, the boosting circuit 100 receives a power supply voltage to generate a positive boosting voltage, a boosting circuit 300 may be provided that receives a ground voltage to generate a negative boosting voltage as shown in FIG. 14. In this case, a boosting circuit for generating a negative boosting voltage can be configured by reversing the polarity of each transistor included in the boosting circuit of each embodiment. For example, the boosting cells P101 to P104, P201 to P204 and P301 to P304, and the backflow preventing cells P401 to P404 of FIG. 2A to FIG. 2C may be configured as shown in FIGS. 15A to 15C. Here, MN1 to MN4 indicate transistors having conductivities reverse to those of M1 to M4, respectively.

Figure 16:
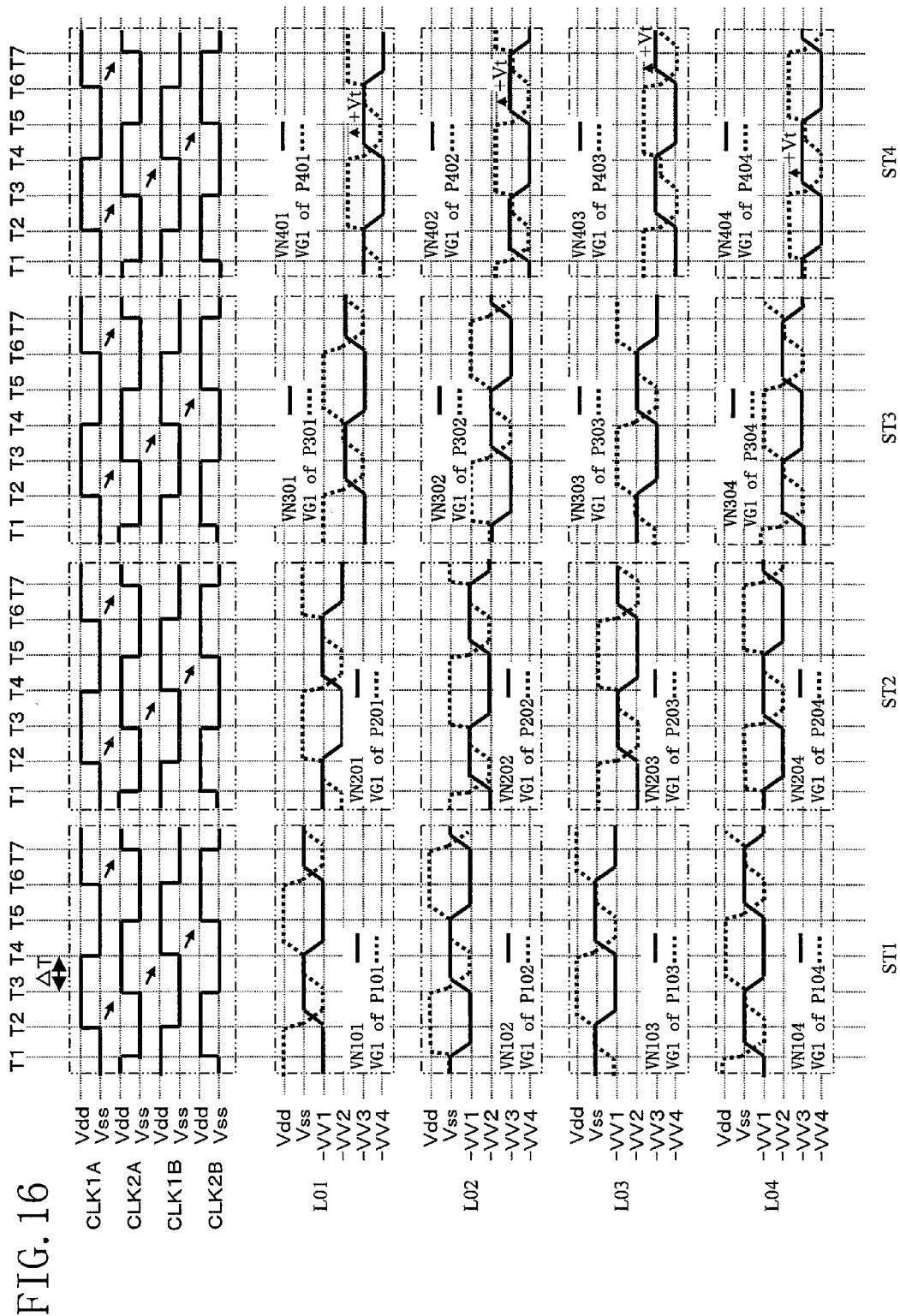
FIG. 16 is a waveform diagram for describing an operation of the boosting circuit of FIG. 14.
Figure 17:
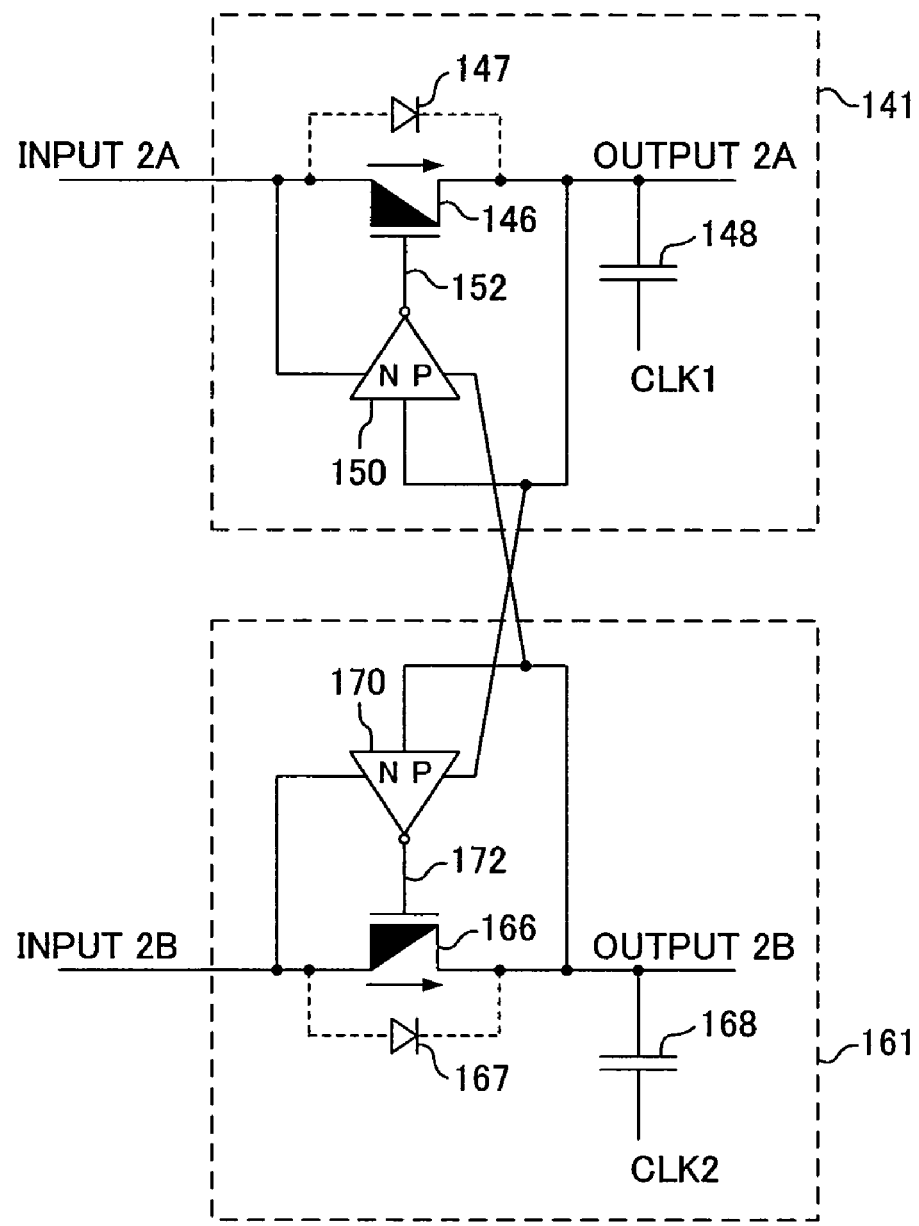
FIG. 17 is a circuit diagram showing a configuration of a conventional boosting circuit.
Figure 18:
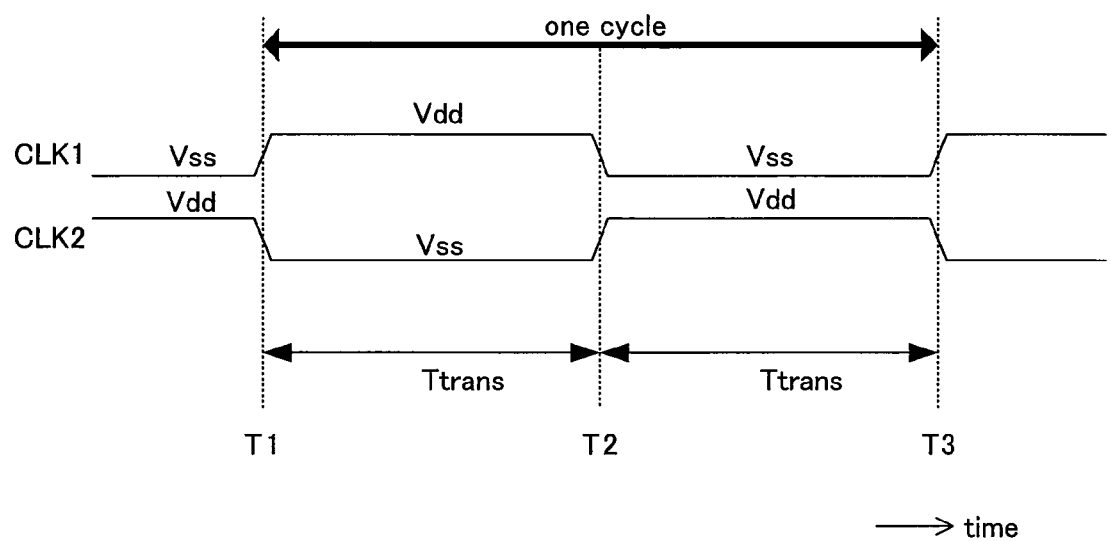
FIG. 18 is a waveform diagram for describing an operation of the boosting circuit of FIG. 17.

By the configuration of FIG. 14, in the boosting circuit 300, the input/output terminal voltages VN101 to VN104 in the boosting stage ST1 each have amplitudes ranging between Vss and −VV1, the input/output terminal voltages VN201 to VN204 in the boosting stage ST2 each have amplitudes ranging between −VV1 and −VV2, the input/output terminal voltages VN301 to VN304 in the boosting stage ST3 each have amplitudes ranging between −VV2 and −VV3, and the intermediate terminal voltages VN401 to VN404 of the backflow preventing circuit ST4 each have amplitudes ranging between −VV3+Vt and −VV4, so that a negative boosting voltage of −VV3 can be generated at the output terminal of the negative boosting circuit 300, as shown in FIG. 16. If a Pch transistor is used as the charge transfer transistor MN1, it is possible to avoid parasitic bipolar generation that is likely to occur when an Nch transistor is employed, so that a stable boosting operation can be performed.

As has been described above, the boosting circuit of the present invention can suppress a backflow of charges that occurs via a charge transfer transistor in a two-phase boosting circuit, and therefore, is useful as a power supply generating circuit for improving a non-volatile semiconductor storage device and a characteristic of an analog circuit in a CMOS process, for example. The boosting circuit of the present invention can also be applied to a power supply circuit and the like, such as a volatile semiconductor (a DRAM, etc.), a liquid crystal device, a mobile device, and the like.

What is claimed is:
1. A boosting circuit having backflow preventing cells arranged in M parallel sequences (M≧4), the backflow preventing cells performing a boosting operation in synchronization with a plurality of clock signals having different phases, wherein
the backflow preventing cell provided in a K-th sequence (1≦K≦M), includes:
an input terminal for receiving a voltage from a stage preceding the backflow preventing cell;
an output terminal for supplying a voltage to an output terminal of the booting circuit;
an intermediate terminal for supplying a voltage to another backflow preventing cell;
a charge transfer unit provided between the input terminal or the output terminal, and the intermediate terminal;
a boosting capacitance having two ends, one end being connected to the intermediate terminal of the backflow preventing cell, and the other end receiving a clock signal corresponding to the backflow preventing cell;
a charge transfer transistor connected between the input terminal and the output terminal of the backflow preventing cell, and for transferring charges from the input terminal to the output terminal when the charge transfer transistor is in a conductive state; and
a state control unit for controlling the charge transfer transistor, depending on an intermediate terminal voltage of a backflow preventing cell in a KA-th sequence (KA=(K−A) when (K−A)>0, and KA=(M−|K−A|) when (K−A)≦0) located A sequences before the K-th sequence (1≦A≦M/2−1: A is a natural number).

2. The boosting circuit of claim 1, wherein
the state control unit controls the charge transfer transistor by switching an input terminal voltage of the K-th sequence, and an intermediate terminal voltage of a backflow preventing cell in a KB-th sequence (KB=(K−B) when (K−B)>0, and KB=(M−|K−B|) when (K−B)≦0) located B sequences before the K-th sequence (A+1≦B≦M/2: B is a natural number).

3. The boosting circuit of claim 2, wherein
the state control unit has an inverter unit for switching the input terminal voltage of the K-th sequence, and the intermediate terminal voltage of the backflow preventing cell in the KB-th sequence, depending on an output terminal voltage of the backflow preventing cell in the KA-th sequence.

4. A boosting circuit having backflow preventing cells arranged in M parallel sequences (M≧4), the backflow preventing cells performing a boosting operation in synchronization with a plurality of clock signals having different phases, wherein
the backflow preventing cell provided in a K-th sequence (1≦K≦M), includes:
an input terminal for receiving a voltage from a stage preceding the backflow preventing cell;
an output terminal for supplying a voltage to an output terminal of the booting circuit;
an intermediate terminal for supplying a voltage to another backflow preventing cell;
a charge transfer unit provided between the input terminal or the output terminal, and the intermediate terminal;
a boosting capacitance having two ends, one end being connected to the intermediate terminal of the backflow preventing cell, and the other end receiving a clock signal corresponding to the backflow preventing cell;
a charge transfer transistor connected between the input terminal and the output terminal of the backflow preventing cell, and for transferring charges from the input terminal to the output terminal when the charge transfer transistor is in a conductive state, and a state control unit having a first terminal and a second terminal, the intermediate terminal of a backflow preventing cell in a KA-th sequence (KA=(K−A) when (K−A)>0, and KA=(M−|K−A|) when (K−A)≦0) located A sequences before the K-th sequence (1≦A≦M/2−1: A is a natural number) being connected to the first terminal, and a gate of the charge transfer transistor being connected to the second terminal.

5. The boosting circuit of claim 4, wherein
the state control unit has a third terminal and a fourth terminal, the input terminal of the K-th sequence being connected the third terminal, and the intermediate terminal of a backflow preventing cell in a KB-th sequence (KB=(K−B) when (K−B)>0, and KB=(M−|K−B|) when (K−B)≦0) located B sequences before the K-th sequence (A+1≦B≦M/2: B is a natural number) being connected to the fourth terminal.

6. The boosting circuit of claim 5, wherein
the state control unit includes a first-conductivity type first transistor and a second-conductivity type second transistor each having a gate connected to the first terminal and a drain connected to the second terminal,
the first transistor has a source connected to the third terminal, and
the second transistor has a source connected to the fourth terminal.

7. The boosting circuit of claim 1 or 4, wherein
the charge transfer unit is a diode-connected third transistor provided between the input terminal and the intermediate terminal.

8. The boosting circuit of claim 1 or 4, wherein
the charge transfer unit is provided between the output terminal and the intermediate terminal, and is controlled, depending on the intermediate terminal voltage of the backflow preventing cell in the KB-th sequence.

9. The boosting circuit of claim 1 or 4, wherein
a transistor unit of the backflow preventing cell other than those of the K-th sequence and a J-th sequence (1≦K≦M, J≠K) is provided between a transistor unit of the backflow preventing cell in the K-th sequence and in the I-th stage, and a transistor unit of the backflow preventing cell in the J-th sequence and in the I-th stage.

10. The boosting circuit of claim 9, wherein
the transistor unit includes both or one of the charge transfer transistor and the state control unit.

11. A boosting circuit having a plurality of clock signals having different phases, and a plurality of boosting cells arranged in M parallel sequences (M≧4) and L stages (L≧2), the boosting cells performing a boosting operation in synchronization with the plurality of clock signals, wherein
one of the boosting cells includes:
a boosting capacitance having two ends, one end being connected to an output terminal of the one of the boosting cells, and the other end receiving a clock signal corresponding to the one of the boosting cells; and
a charge transfer transistor connected between the input terminal and the output terminal of the one of the boosting cells, wherein
an output terminal of another one of the boosting cells in the same stage as the one of the boosting cells and in a first sequence of the sequences different from the one of the boosting cells is connected to a control terminal of a state control unit for controlling both an on state and an off state of the charge transfer transistor of the one of the boosting cells, and M boosting cells in the same stage as the one of the boosting cells are connected to one another so as to have a ring shape.

12. The boosting circuit of claim 11, wherein
the state control unit includes:
a first transistor of a first conductivity type, of which a gate is connected to the output terminal of the one of the boosting cells in the first sequence, and a drain is connected to a first terminal; and
a second transistor of a second conductivity type, of which a gate is connected to the output terminal of the one of the boosting cells in the first sequence, and a drain is connected to a first terminal, and
the source of the first transistor is connected to the input terminal of the one of the boosting cells, and
the source of the second transistor is connected to an output terminal of another one of the boosting cells in a second sequence.

13. The boosting circuit of claim 11, wherein
the one of the boosting cells of the first sequence is arranged, with respect to one of the boosting cells arranged in a K-th sequence in a KA-th sequence (KA=(K−A) when (K−A)>0, and KA=(M−|K−A|) when (K−A)<0) located A sequences before the K-th sequence (1≦A≦M/2−1: A is a natural number).

14. The boosting circuit of claim 12, wherein
the one of the boosting cells of the second sequence is arranged, with respect to the boosting cell arranged in a K-th sequence (1≦K≦M), in a KB-th sequence (KB=(K−B) when (K−B)>0, and KB=(M−|K−B|) when (K−B)≦0) located B sequences before the K-th sequence (A+1≦B≦M/2: B is a natural number).

15. A boosting circuit having a plurality of clock signals having different phases, and a plurality of boosting cells arranged in M parallel sequences (M≧4) and L stages (L≧2), the boosting cells performing a boosting operation in synchronization with the plurality of clock signals, wherein
one of the boosting cells includes:
a boosting capacitance having two ends, one end being connected to an output terminal of the one of the boosting cells, and the other end receiving a clock signal corresponding to the one of the boosting cells;
a charge transfer transistor connected between the input terminal and the output terminal of the one of the boosting cells; and
a state control unit including for controlling both an on state and an off state of a charge transfer transistor of the boosting cell by, according to an output terminal of another one of the boosting cells in the same stage as the one of the boosting cells and in a first sequence of the sequences different from the one of the boosting cells, switching between the input terminal voltage of the one of the boosting cells, and an output terminal voltage of another one of the boosting cells in the same stage as the one of the boosting cells and in a second sequence of one of the sequences different from the one of the boosting cells.

16. The boosting circuit of claim 15, wherein
the state control unit includes:
a first transistor of a first conductivity type, of which a gate is connected to the output terminal of the one of the boosting cells in the first sequence, and a drain is connected to a first terminal; and a second transistor of a second conductivity type, of which a gate is connected to the output terminal of the one of the boosting cells in the first sequence, and a drain is connected to a first terminal, and the source of the first transistor is connected to the input terminal of the one of the boosting cells, and the source of the second transistor is connected to an output terminal of another one of the boosting cells in the second sequence.

17. The boosting circuit of claim 15, wherein
the one of the boosting cells of the first sequence is arranged, with respect to one of the boosting cells arranged in a K-th sequence ($1 \leq K \leq M$), in a KA-th sequence ($KA=(K-A)$ when $(K-A)>0$, and $KA=(M-|K-A|)$ when $(K-A)\leq 0$) located A sequences before the K-th sequence ($1 \leq A \leq M/2-1$: A is a natural number).

18. The boosting circuit of claim 15, wherein
the one of the boosting cells of the second sequence is arranged, with respect to the boosting cell arranged in a K-th sequence ($1 \leq K \leq M$), in a KB-th sequence ($KB=(K-B)$ when $(K-B)>0$, and $KB=(M-|K-B|)$ when $(K-B)\leq 0$) located B sequences before the K-th sequence ($A+1 \leq B \leq M/2$: B is a natural number).

19. A boosting circuit having a plurality of clock signals having different phases, and a plurality of boosting cells arranged in M parallel sequences ($M \geq 4$) and L stages ($L \geq 2$), the boosting cells performing a boosting operation in synchronization with the plurality of clock signals, wherein
one of the boosting cells includes:
a boosting capacitance having two ends, one end being connected to an output terminal of the one of the boosting cells, and the other end receiving a clock signal corresponding to the one of the boosting cells; and
a charge transfer transistor connected between the input terminal and the output terminal of the one of the boosting cells, wherein
according to a signal from an output terminal of another one of the boosting cells in the same stage as the one of the boosting cells and in a first sequence of the sequences different from the one of the boosting cells, a charge transfer transistor of the one of the boosting cells is set to be a non-conductive state, and then, a boosting operation of the one of the boosting cells is performed, said signal from the output terminal of said another one of the boosting cells controlling both the non-conductive state and a conductive state of the charge transfer transistor.

20. The boosting circuit of claim 19, wherein
the one of the boosting cells of the first sequence is arranged, with respect to one of the boosting cells arranged in a K-th sequence ($1 \leq K \leq M$), in a KA-th sequence ($KA=(K-A)$ when $(K-A)>0$, and $KA=(M-|K-A|)$ when $(K-A)\leq 0$) located A sequences before the K-th sequence ($1 \leq A \leq M/2-1$: A is a natural number).

21. The boosting circuit of claim 20, wherein
the boosting operation of the one of the boosting cells is to pump the boosting capacitance one end of which is connected to the output terminal of the one of the boosting cells by a clock signal corresponding to the one of the boosting cells.

22. A boosting circuit having a plurality of clock signals having different phases, and backflow preventing cells arranged in M parallel sequences ($M \geq 4$) and L stages ($L \geq 2$), the boosting cells performing a boosting operation in synchronization with the plurality of clock signals, wherein one of the backflow preventing cells includes:
an input terminal;
an output terminal;
an intermediate terminal;
a charge transfer unit provided between the input terminal or the output terminal, and the intermediate terminal;
a boosting capacitance having two ends, one end being connected to the intermediate terminal of the one of the backflow preventing cells, and the other end receiving a clock signal corresponding to the one of the backflow preventing cells; and
a charge transfer transistor connected between the input terminal and the output terminal of the one of the backflow preventing cells, an intermediate terminal of another one of the backflow preventing cells in the same stage as the one of the backflow preventing cells and in a first sequence of the sequences different from the one of the backflow preventing cells is connected to a control terminal of a state control unit for controlling the charge transfer transistor of the one of the backflow preventing cells, and M backflow preventing cells in the same stage as the one of the backflow preventing cells are connected to one another so as to have a ring shape.

23. The boosting circuit of claim 22, wherein
the state control unit includes:
a first transistor of a first conductivity type, of which a gate is connected to the output terminal of the one of the backflow preventing cells in the first sequence, and a drain is connected to a first terminal; and
a second transistor of a second conductivity type, of which a gate is connected to the output terminal of the one of the backflow preventing cells in the first sequence, and a drain is connected to a first terminal, and the source of the first transistor is connected to the input terminal of the one of the backflow preventing cells, and the source of the second transistor is connected to an intermediate terminal of another one of the backflow preventing cells in a second sequence.

24. The boosting circuit of claim 22, wherein
the one of the backflow preventing cell of the first sequence is arranged, with respect to the backflow preventing cell arranged in a K-th sequence ($1 \leq K \leq M$), in a KA-th sequence ($KA=(K-A)$ when $(K-A)>0$, and $KA=(M-|K-A|)$ when $(K-A)\leq 0$) located A sequences before the K-th sequence ($1 \leq A \leq M/2-1$: A is a natural number).

25. A boosting circuit having a plurality of clock signals having different phases, and backflow preventing cells arranged in M parallel sequences ($M \geq 4$) and L stages ($L \geq 2$), the boosting cells performing a boosting operation in synchronization with the plurality of clock signals, wherein
one of the backflow preventing cells includes:
an input terminal;
an output terminal;
an intermediate terminal;
a charge transfer unit provided between the input terminal or the output terminal, and the intermediate terminal;
a boosting capacitance having two ends, one end being connected to the intermediate terminal of the backflow preventing cell, and the other end receiving a clock signal corresponding to the backflow preventing cell;

a charge transfer transistor connected between the input terminal and the output terminal of the backflow preventing cell; and a state control unit including for controlling a charge transfer transistor of the boosting cell by, according to an intermediate terminal of the another one of the backflow preventing cells in the same stage as the one of the backflow preventing cells and in a first sequence of the sequences different from the one of the backflow preventing cells, switching between an input terminal voltage of the one of the backflow preventing cells, and an intermediate terminal voltage of another one of the backflow preventing cells in the same stage as the one of the backflow preventing cells and in a second sequence of the sequences different from the one of the backflow preventing cells.

26. The boosting circuit of claim 25, wherein the state control unit includes:

a first transistor of a first conductivity type, of which a gate is connected to the intermediate terminal of the one of the of the backflow preventing cells in the first sequence, and a drain is connected to a first terminal; and a second transistor of a second conductivity type, of which a gate is connected the intermediate terminal of the one of the backflow preventing cells in the first sequence, and a drain is connected to a first terminal, and the source of the first transistor is connected to the intermediate terminal of the one of the backflow preventing cells, and the source of the second transistor is connected to an intermediate terminal of the another one of the backflow preventing cells in the second sequence.

27. The boosting circuit of claim 25, wherein the one of the backflow preventing cells of the first sequence is arranged, with respect to the backflow preventing cell arranged in a K-th sequence ($1 \leq K \leq M$), in a KA-th sequence ($KA=(K-A)$ when $(K-A)>0$, and $KA=(M-|K-A|)$ when $(K-A) \leq 0$) located A sequences before the K-th sequence ($1 \leq A \leq M/2-1$: A is a natural number).

28. The boosting circuit of claim 27, wherein the one of the backflow preventing cells of the second sequence is arranged, with respect to the backflow preventing cell arranged in a K-th sequence ($1 \leq K \leq M$), in a KB-th sequence ($KB=(K-B)$ when $(K-B)>0$, and $KB=(M-|K-B|)$ when $(K-B) \leq 0$) located B sequences before the K-th sequence ($A+1 \leq B \leq M/2$: B is a natural number).

29. A boosting circuit having a plurality of clock signals having different phases, and backflow preventing cells arranged in M parallel sequences ($M \geq 4$) and L stages ($L \geq 2$), the boosting cells performing a boosting operation in synchronization with the plurality of clock signals, wherein one of the backflow preventing cell includes:
an input terminal;
an output terminal;
an intermediate terminal;
a charge transfer unit provided between the input terminal or the output terminal, and the intermediate terminal;
a boosting capacitance having two ends, one end being connected to the intermediate terminal of the backflow preventing cell, and the other end receiving a clock signal corresponding to the backflow preventing cell; and
a charge transfer transistor connected between the input terminal and the output terminal of the backflow preventing cell, wherein according to an intermediate terminal of another one of backflow preventing cells in the same stage as the one of the backflow preventing cells and in a first sequence of the sequences different from the one of the backflow preventing cells, a charge transfer transistor of the one of the backflow preventing cells is set to be a non-conductive state, and then, a boosting operation of the one of the backflow preventing cells is performed.

30. The boosting circuit of claim 29, wherein the one of the backflow preventing cells of the first sequence is arranged, with respect to the backflow preventing cell arranged in a K-th sequence ($1 \leq K \leq M$), in a KA-th sequence ($KA=(K-A)$ when $(K-A)>0$, and $KA=(M-|K-A|)$ when $(K-A) \leq 0$) located A sequences before the K-th sequence ($1 \leq A \leq M/2-1$: A is a natural number).

31. The boosting circuit of claim 29, wherein the boosting operation of the one of the backflow preventing cells is to pump the boosting capacitance one end of which is connected to the intermediate terminal of the backflow preventing cell by a clock signal corresponding to the backflow preventing cell.

32. The boosting circuit of claim 11, wherein a source terminal of the one of the boosting cells supplies a source signal to a gate of the charge transfer transistor based on a signal from the control terminal of the one of the boosting cells, and the output terminal of the another one of the boosting cells is not connected to the source terminal of the one of the boosting cells.

33. The boosting circuit of claim 15, wherein a source terminal of the one of the boosting cells supplies a source signal to a gate of the charge transfer transistor based on a signal from the control terminal of the one of the boosting cells, and the output terminal of the another one of the boosting cells is not connected to the source terminal of the one of the boosting cells.

34. The boosting circuit of claim 19, wherein a source terminal of the one of the boosting cells supplies a source signal to a gate of the charge transfer transistor based on a signal from the control terminal of the one of the boosting cells, and the output terminal of the another one of the boosting cells is not connected to the source terminal of the one of the boosting cells.

* * * * *

UNITED STATES PATENT AND TRADEMARK OFFICE
CERTIFICATE OF CORRECTION

PATENT NO. : 7,924,086 B2
APPLICATION NO. : 12/370057
DATED : April 12, 2011
INVENTOR(S) : Seiji Yamahira It is certified that error appears in the above-identified patent and that said Letters Patent is hereby corrected as shown below:

On the title page of the patent, in Item "(56) References Cited", under "US DOCUMENTS", insert --US 6,995,603  02/2006  Chen et al.-- and --US2007-0273431  A1  11/2007  Sakurai et al.--

Signed and Sealed this
Fourteenth Day of June, 2011

David J. Kappos
*Director of the United States Patent and Trademark Office*